United States Patent
Fang et al.

(10) Patent No.: US 10,350,794 B2
(45) Date of Patent: *Jul. 16, 2019

(54) POROUS POLYMER MEMBRANES, METHODS OF MAKING, AND METHODS OF USE

(71) Applicant: University of Florida Research Foundation, Gainesville, FL (US)

(72) Inventors: Yin Fang, Gainesville, FL (US); Khalid Askar, Gainesville, FL (US); Blayne M. Phillips, Gainesville, FL (US); Peng Jiang, Gainesvile, FL (US)

(73) Assignee: UNIVERSITY OF FLORIDA RESEARCH FOUNDATION, INC., Gainesville, FL (US)

(*) Notice: Subject to any disclaimer, the term of this patent is extended or adjusted under 35 U.S.C. 154(b) by 250 days.

This patent is subject to a terminal disclaimer.

(21) Appl. No.: 15/140,905

(22) Filed: Apr. 28, 2016

(65) Prior Publication Data

US 2016/0257036 A1 Sep. 8, 2016

Related U.S. Application Data

(63) Continuation-in-part of application No. PCT/US2014/063172, filed on Oct. 30, 2014.
(Continued)

(51) Int. Cl.
*B29C 39/02* (2006.01)
*C08J 5/18* (2006.01)
*C08F 222/10* (2006.01)
*B29K 33/04* (2006.01)
*B29L 31/00* (2006.01)

(52) U.S. Cl.
CPC ............ *B29C 39/02* (2013.01); *C08F 222/10* (2013.01); *C08J 5/18* (2013.01); *B29K 2033/04* (2013.01); *B29L 2031/755* (2013.01)

(58) Field of Classification Search
CPC .......... B29C 39/02; C08F 222/10; C08J 5/18; B29L 2031/755; B29K 2033/04
See application file for complete search history.

(56) References Cited

U.S. PATENT DOCUMENTS 3,671,105 A 6/1972 Williams et al.
4,125,319 A 11/1978 Frank et al.
(Continued)

FOREIGN PATENT DOCUMENTS

| WO | 1998020388 | 5/1998 |
| WO | 2002073699 | 9/2002 |
| WO | 2008060322 | 5/2008 |

OTHER PUBLICATIONS

USPTO Assignment Data for 15140905 (Year: 2018).*
USPTO Assignment Data for 15145910 (Year: 2018).*

*Primary Examiner* — Frank J Vineis
*Assistant Examiner* — Michael Zhang
(74) *Attorney, Agent, or Firm* — Thomas Horstemeyer, LLP

(57) ABSTRACT

In accordance with the purpose(s) of the present disclosure, as embodied and broadly described herein, embodiments of the present disclosure, in one aspect, relate to porous polymer membranes, structures including porous polymer membranes, devices including porous polymer membranes, methods of using porous polymer membranes, methods of making porous polymer membranes, and the like.

10 Claims, 20 Drawing Sheets

Related U.S. Application Data

(60) Provisional application No. 61/897,848, filed on Oct. 31, 2013.

(56) References Cited

U.S. PATENT DOCUMENTS

| | | |
|---|---|---|
| 4,340,479 A | 7/1982 | Pall |
| 4,781,441 A | 11/1988 | Kanbe et al. |
| 5,147,716 A | 9/1992 | Bellus |
| 5,429,743 A | 7/1995 | Geus et al. |
| 5,641,332 A | 6/1997 | Faber et al. |
| 5,753,014 A | 5/1998 | Van |
| 5,948,470 A | 9/1999 | Harrison et al. |
| 5,993,661 A | 11/1999 | Ruckenstein et al. |
| 6,044,981 A | 4/2000 | Chu et al. |
| 6,531,304 B1 | 3/2003 | Boennemann; et al. |
| 6,565,763 B1 | 5/2003 | Asakawa et al. |
| 6,649,255 B1 | 11/2003 | Fain et al. |
| 6,929,764 B2 | 8/2005 | Jiang et al. |
| 6,958,137 B2 | 10/2005 | Lee et al. |
| 7,630,589 B2 | 12/2009 | Kilic et al. |
| 7,691,325 B2 | 4/2010 | Chopra et al. |
| 7,889,954 B2 | 2/2011 | Sailor et al. |
| 2003/0031438 A1 | 2/2003 | Kambe et al. |
| 2004/0131799 A1 | 7/2004 | Arsenault et al. |
| 2006/0137462 A1 | 6/2006 | Divigalpitiya et al. |
| 2007/0206270 A1 | 9/2007 | Iwamatsu et al. |
| 2008/0006574 A1 | 1/2008 | Ramaswamy et al. |
| 2008/0027199 A1 | 1/2008 | Mazurek et al. |
| 2008/0185498 A1* | 8/2008 | Purdy .............. B82Y 20/00 250/201.1 |
| 2008/0233418 A1 | 9/2008 | Krueger |
| 2008/0309923 A1 | 12/2008 | Falk |
| 2009/0034051 A1 | 2/2009 | Arsenault et al. |
| 2010/0051561 A1 | 3/2010 | Lee |
| 2010/0068168 A1 | 3/2010 | Song et al. |
| 2010/0150511 A1* | 6/2010 | Arsenault .......... B82Y 20/00 385/130 |
| 2010/0155325 A1* | 6/2010 | Zhang .............. B01D 39/1692 210/500.21 |
| 2010/0188732 A1 | 7/2010 | Akashi et al. |
| 2010/0315703 A1 | 12/2010 | Purdy et al. |
| 2011/0097814 A1 | 4/2011 | Bommarito et al. |
| 2011/0233476 A1 | 9/2011 | Arsenault |
| 2011/0255035 A1 | 10/2011 | Wu |
| 2012/0073388 A1 | 3/2012 | Chibante |
| 2012/0074612 A1 | 3/2012 | Scrivens et al. |
| 2012/0262789 A1* | 10/2012 | Xie ..................... C08L 63/00 359/578 |
| 2012/0293802 A1 | 11/2012 | Ozin et al. |
| 2013/0199995 A1* | 8/2013 | Jiang .............. B01D 67/0006 210/500.27 |
| 2013/0222881 A1 | 8/2013 | Aizenberg et al. |
| 2013/0320467 A1 | 12/2013 | Buchanan et al. |
| 2014/0106468 A1 | 4/2014 | Boersma |
| 2016/0326334 A1* | 11/2016 | Jiang .................. G01N 21/00 |
| 2017/0225395 A1 | 8/2017 | Boydston et al. |

* cited by examiner

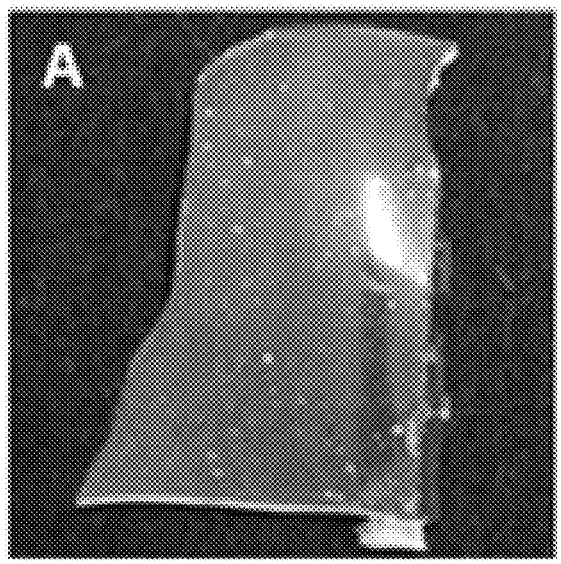 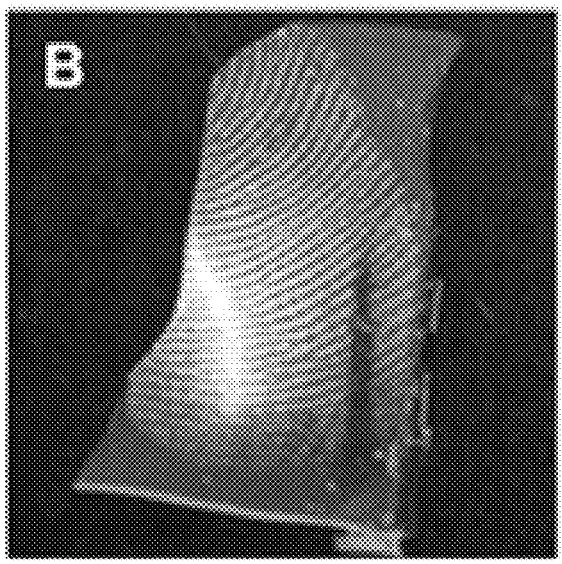
FIG. 1.1A  FIG. 1.1B

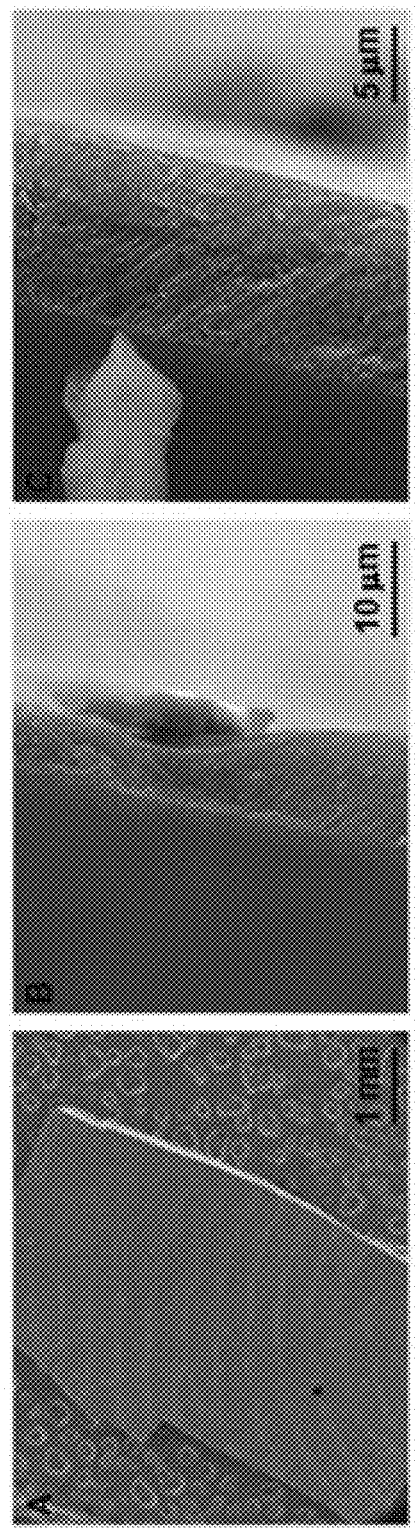
FIG. 1.2C
FIG. 1.2B
FIG. 1.2A
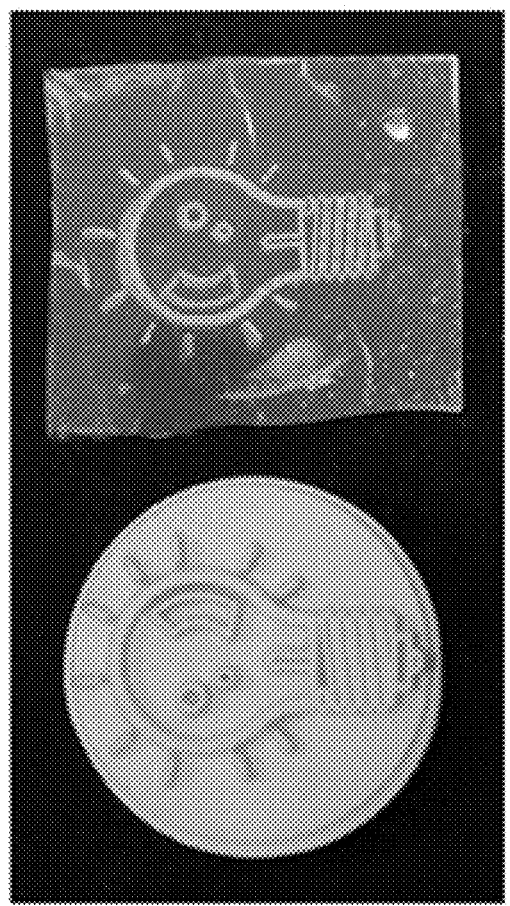
FIG. 1.3

FIG. 1.4
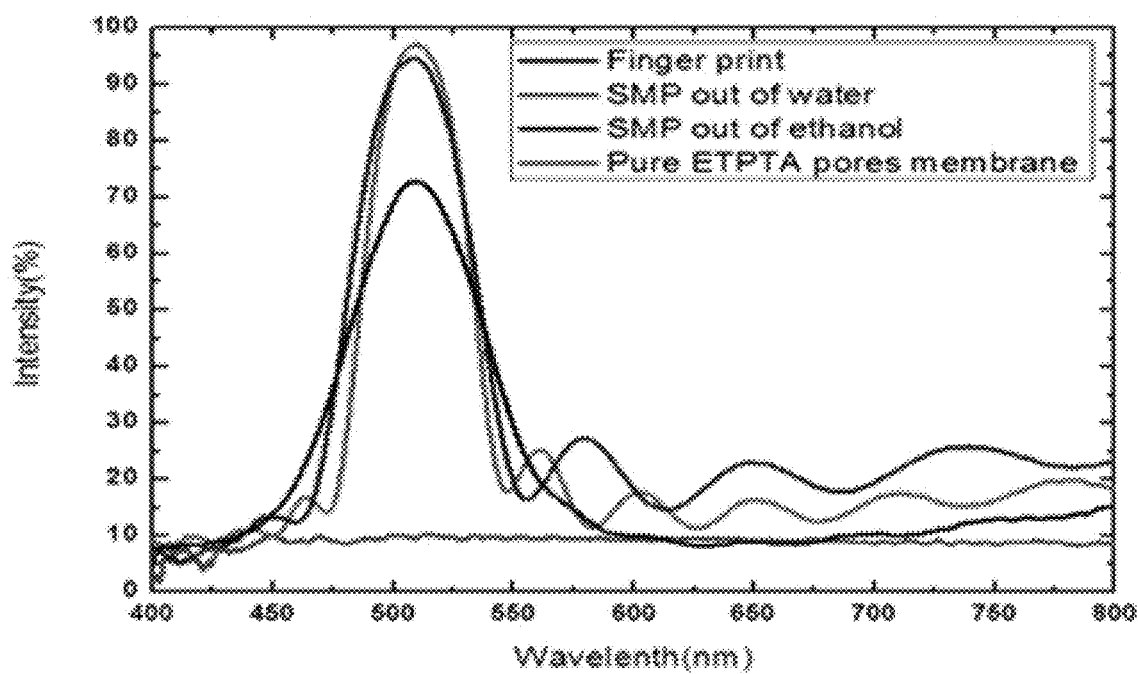
FIG. 1.5

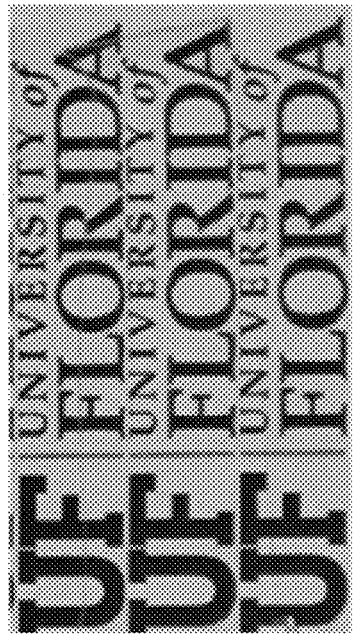
FIG. 1.6A
FIG. 1.6B
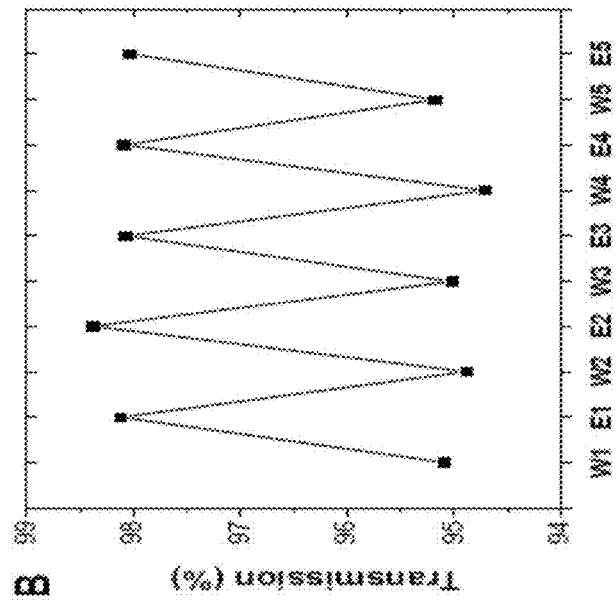
FIG. 1.7A
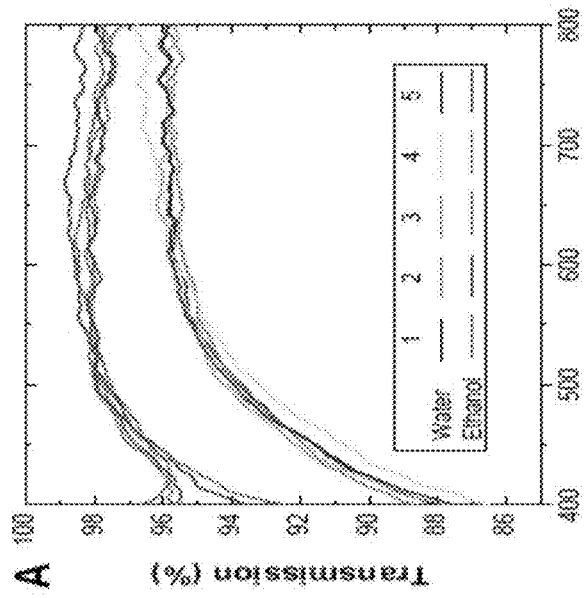
FIG. 1.7B

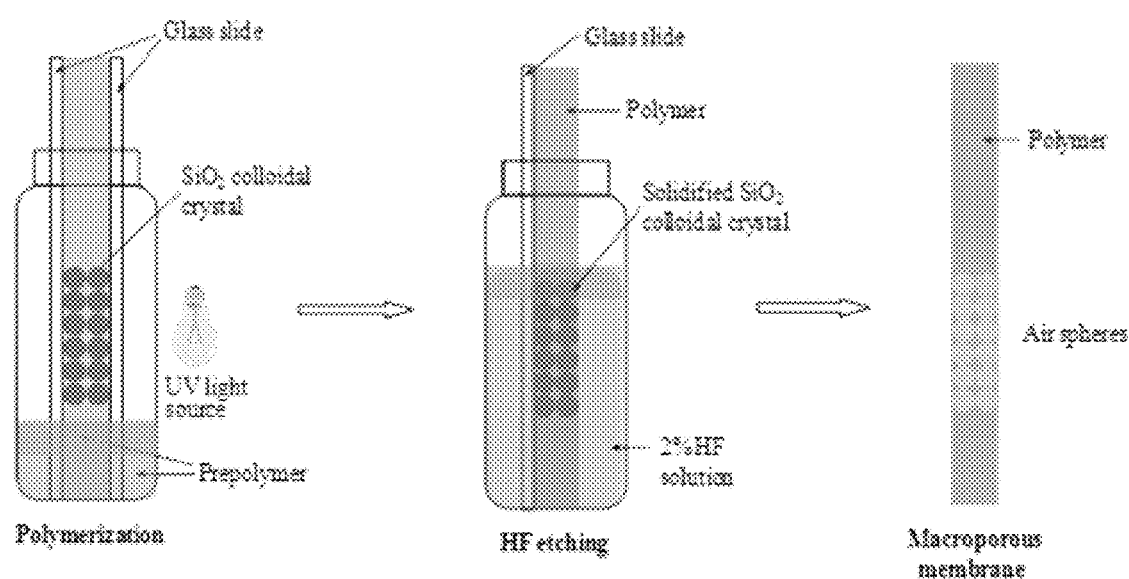
FIG. 1.8

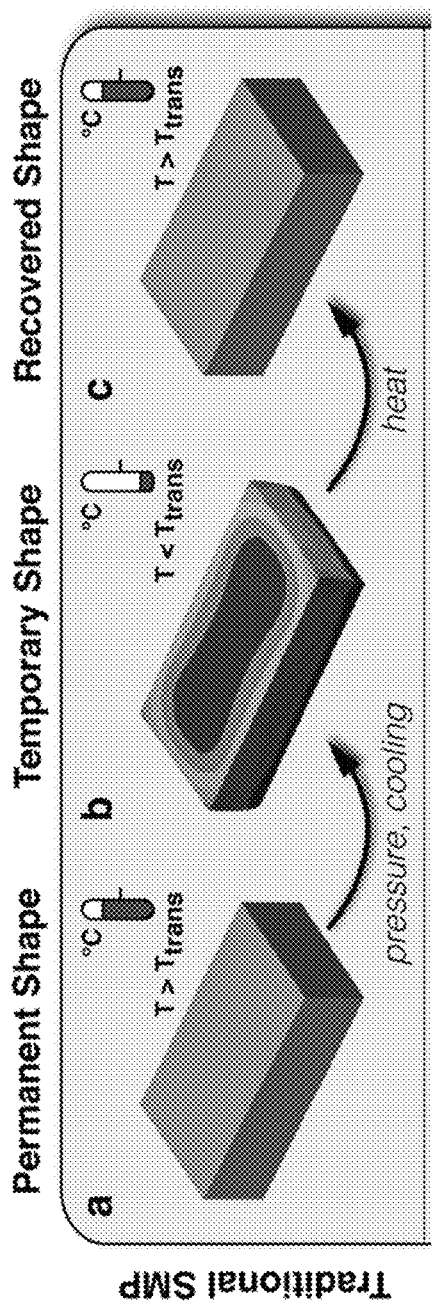
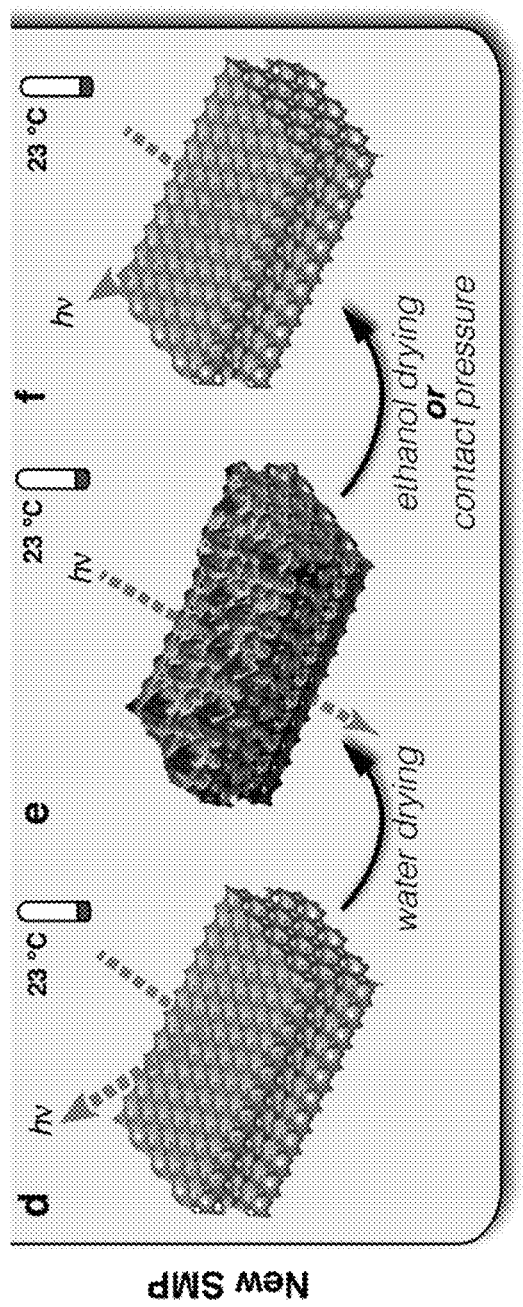
FIG. 2.1A  FIG. 2.1B  FIG. 2.1C
FIG. 2.1D  FIG. 2.1E  FIG. 2.1F

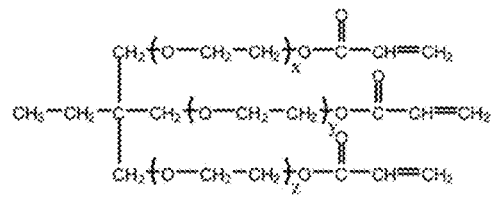
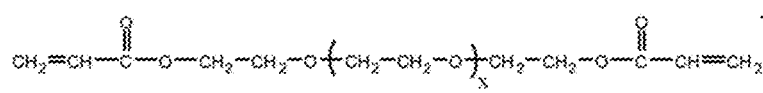
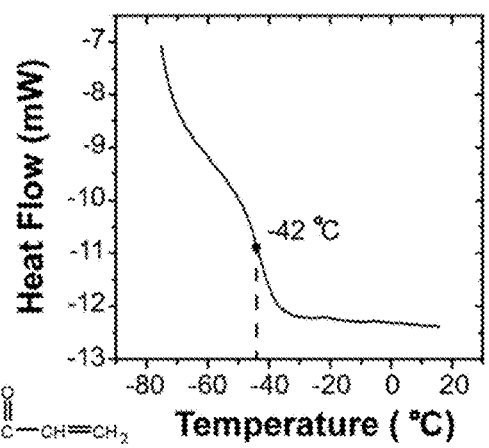
FIG. 2.2A
FIG. 2.2B
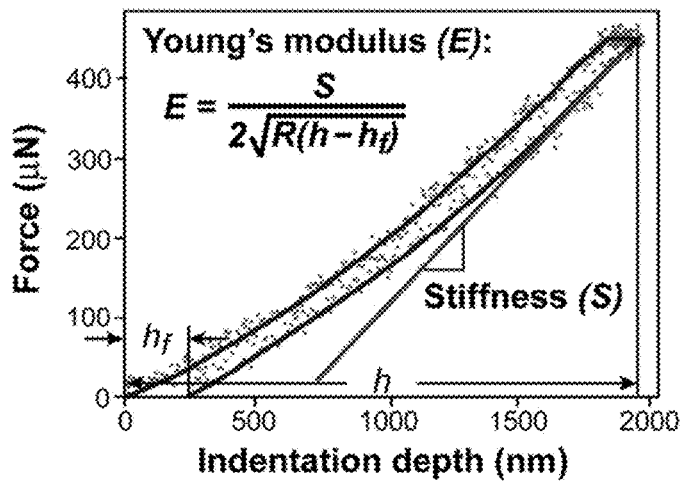
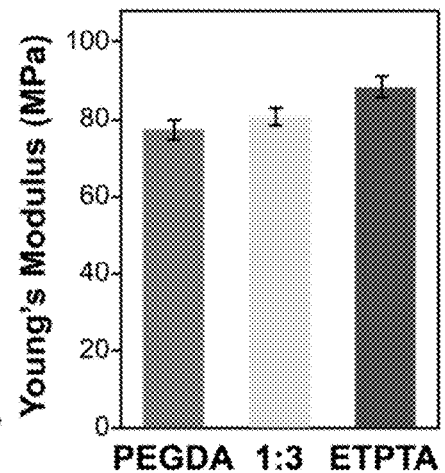
FIG. 2.2C
FIG. 2.2D

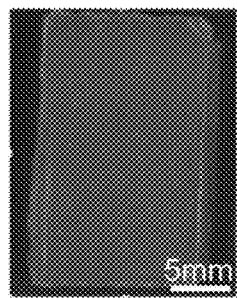 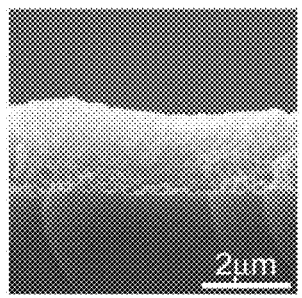 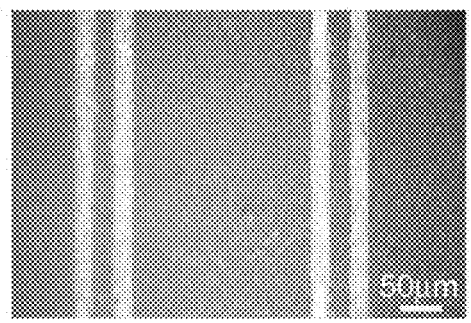
FIG. 2.3A  FIG. 2.3B  FIG. 2.3G
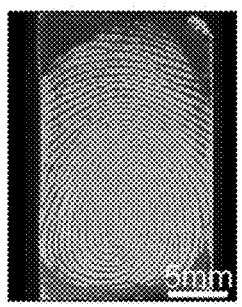 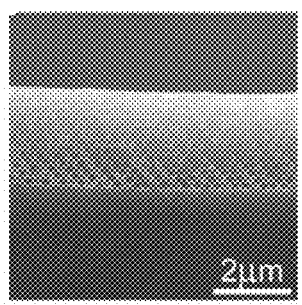 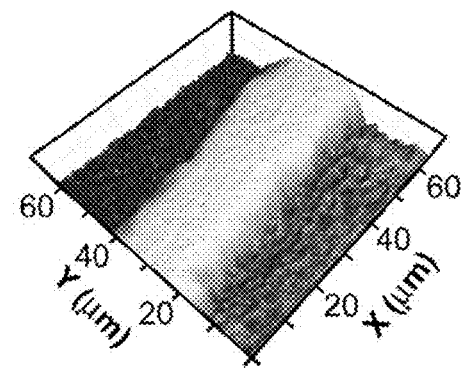
FIG. 2.3C  FIG. 2.3D  FIG. 2.3H
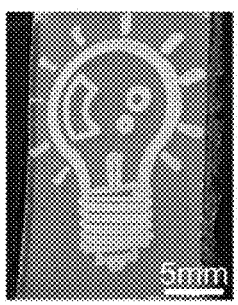 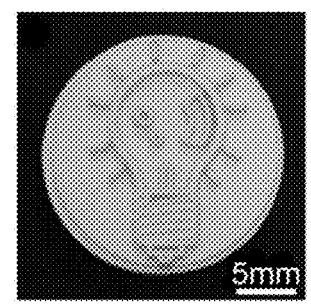 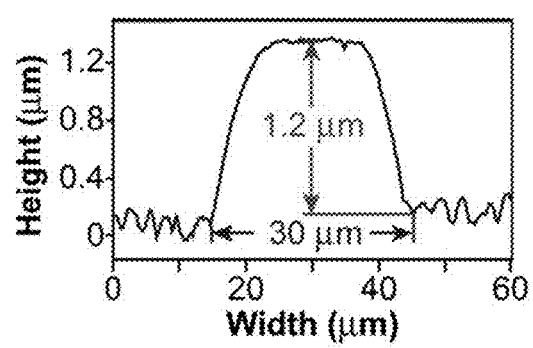
FIG. 2.3E  FIG. 2.3F  FIG. 2.3I

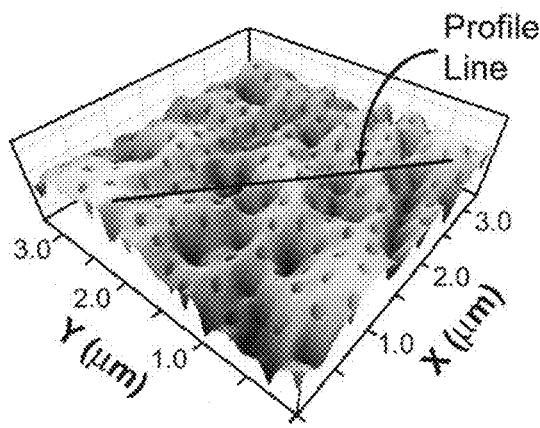
FIG. 2.4A
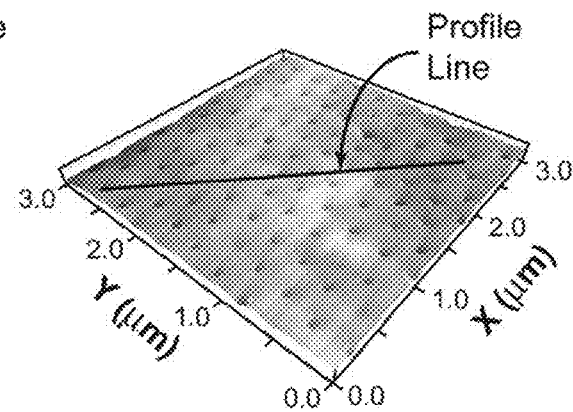
FIG. 2.4B
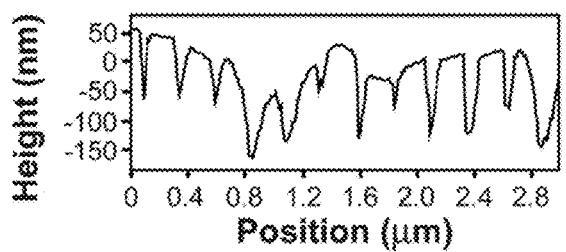
FIG. 2.4C
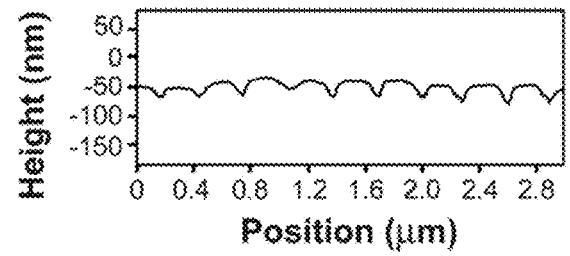
FIG. 2.4D
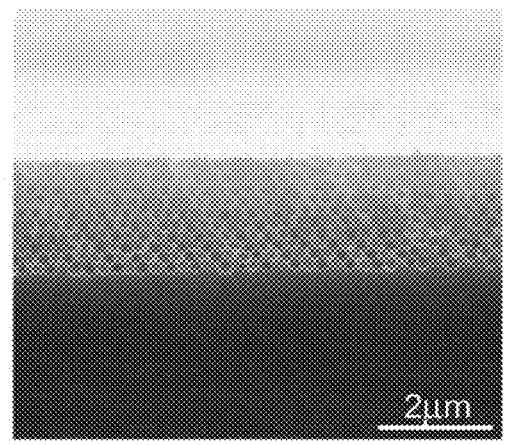
FIG. 2.4E
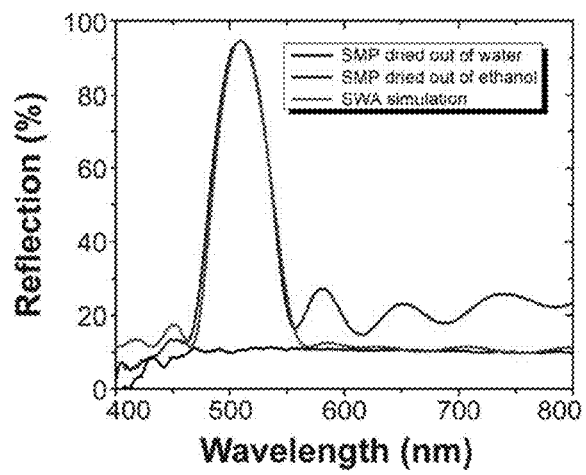
FIG. 2.4F

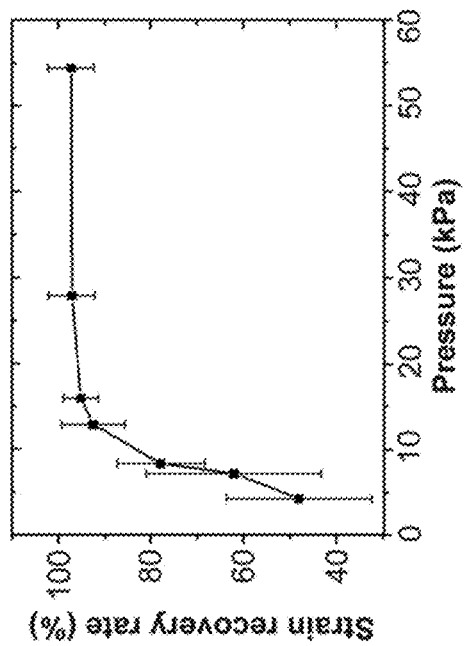
FIG. 2.5A
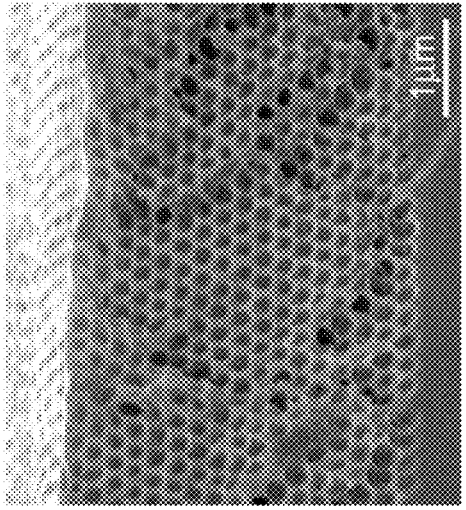
FIG. 2.5B
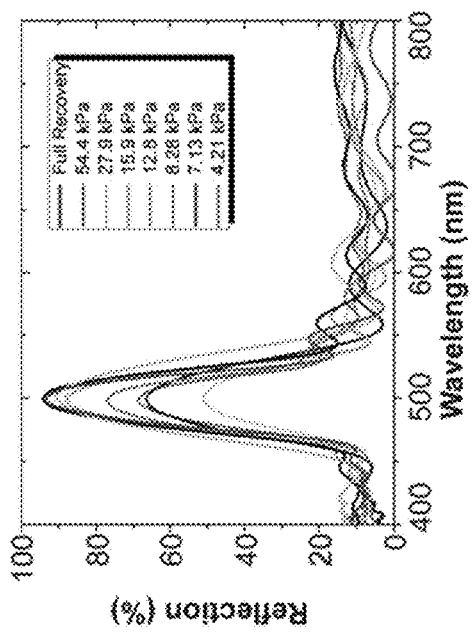
FIG. 2.5C
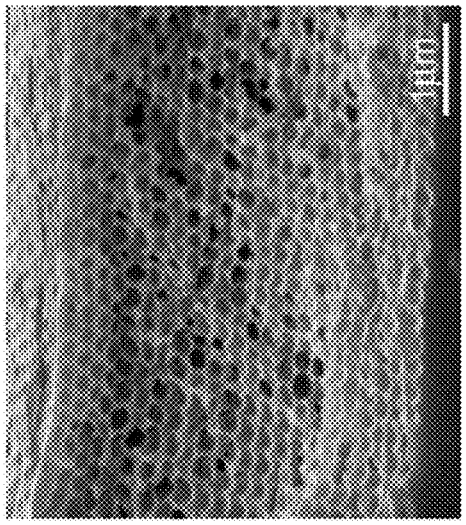
FIG. 2.5D

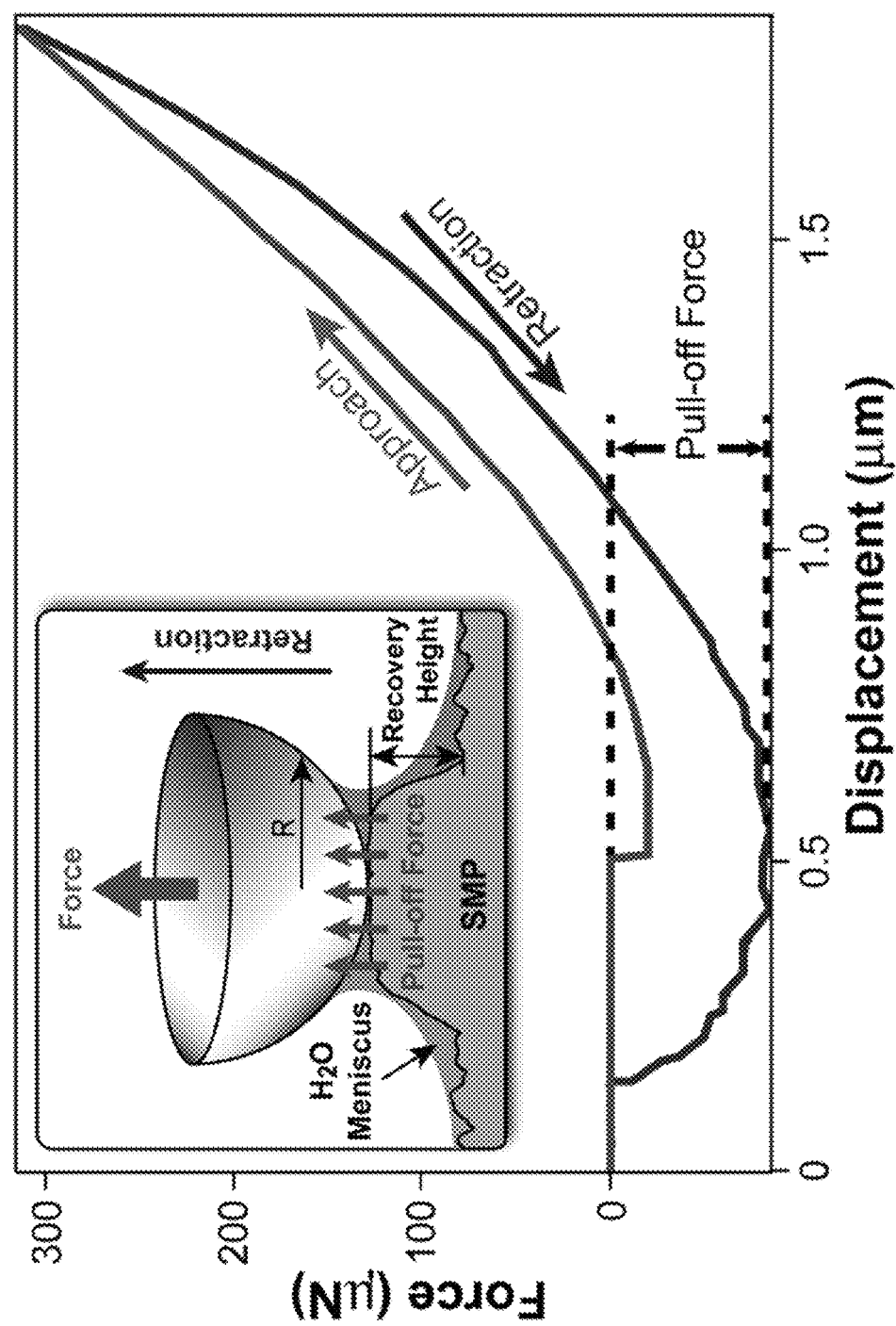
FIG. 2.6

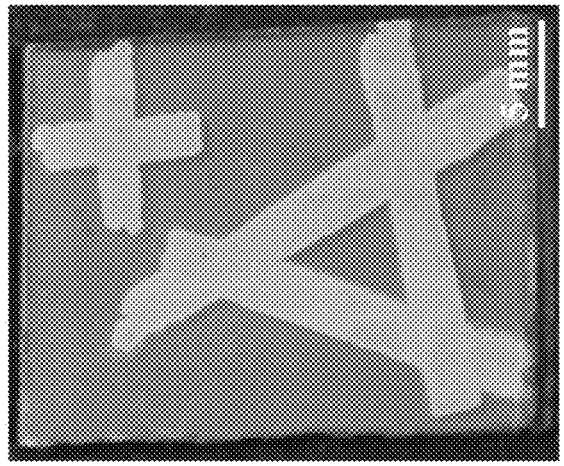
FIG. 3.1B
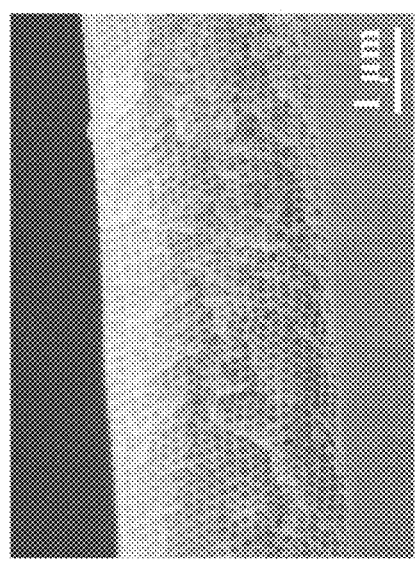
FIG. 3.1D
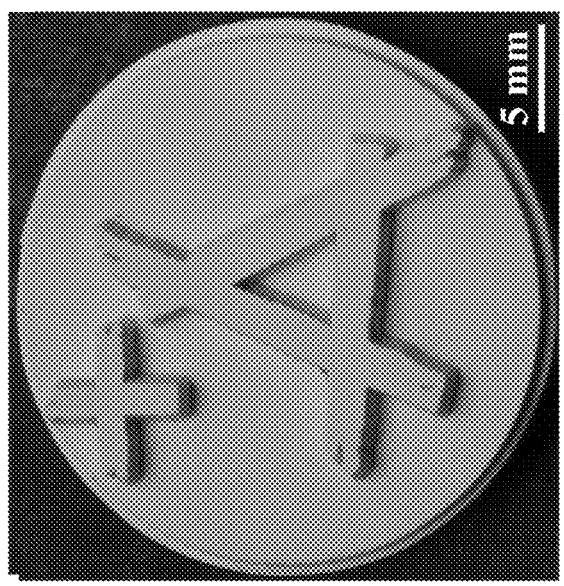
FIG. 3.1A
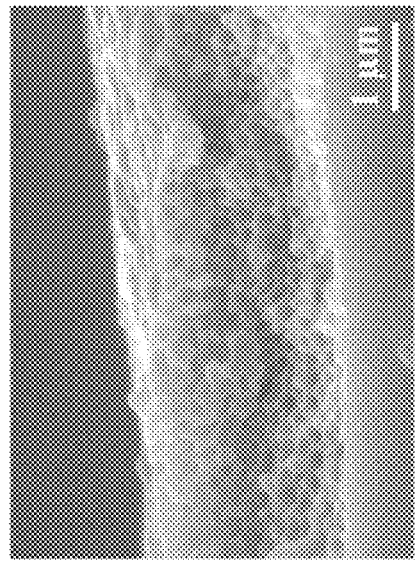
FIG. 3.1C

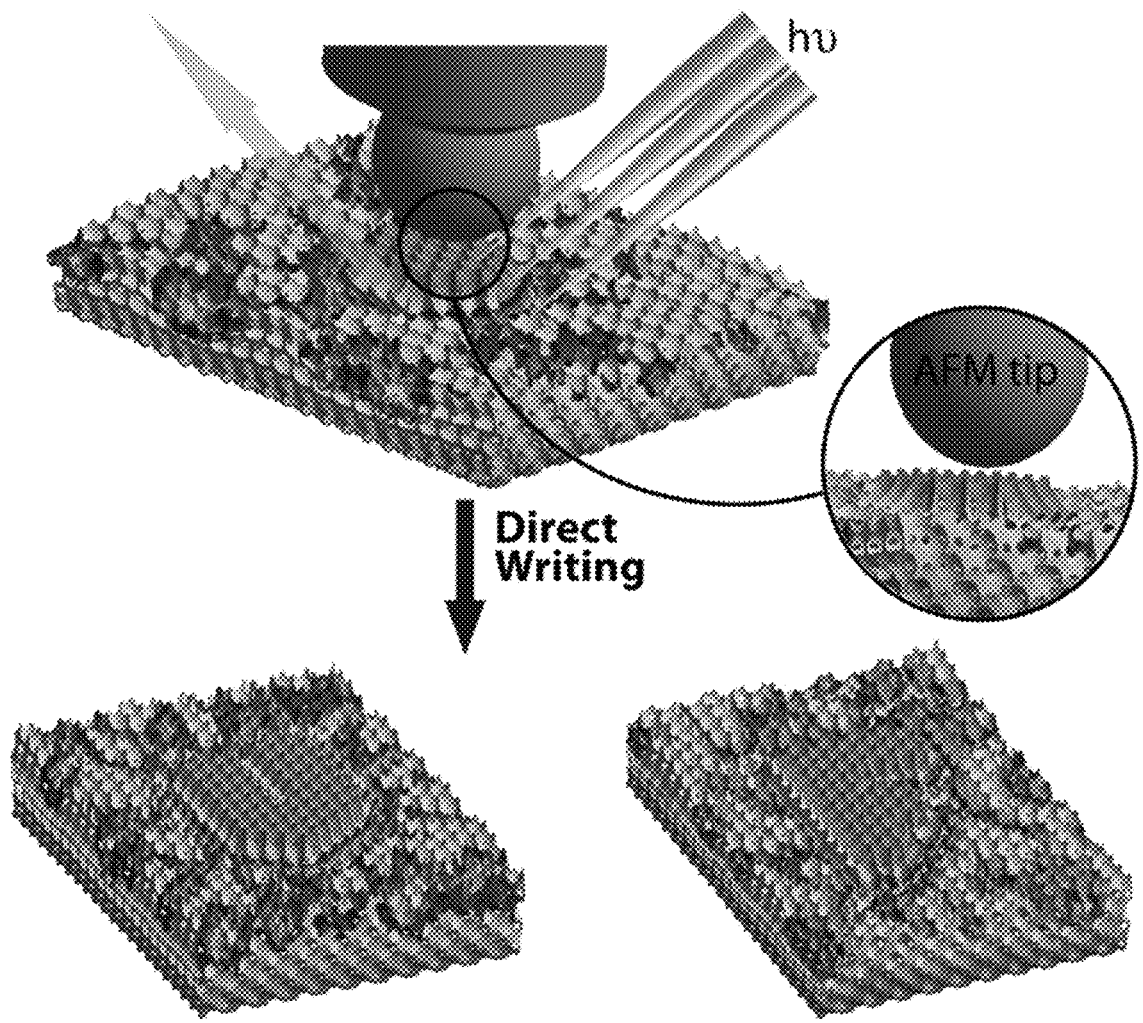
FIG. 3.2

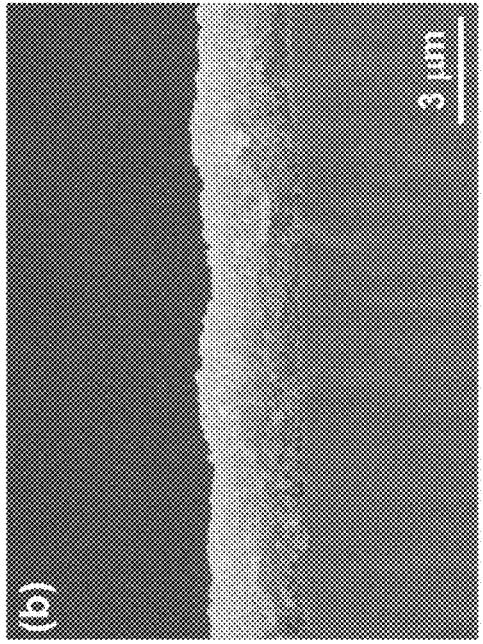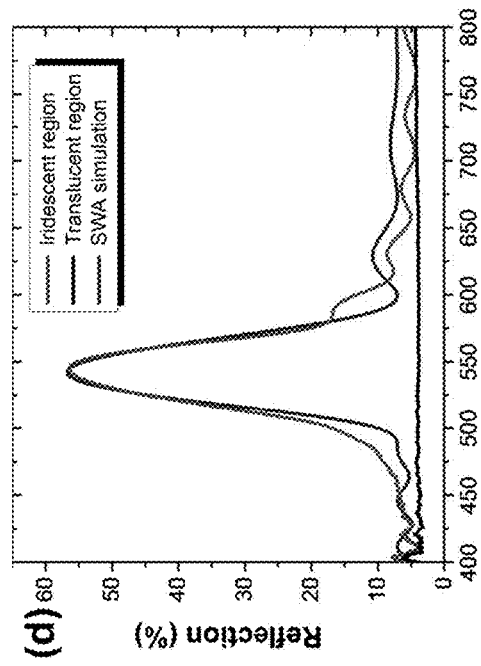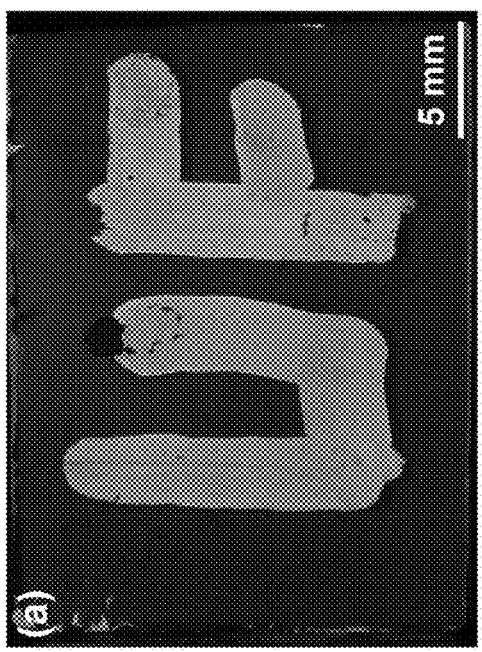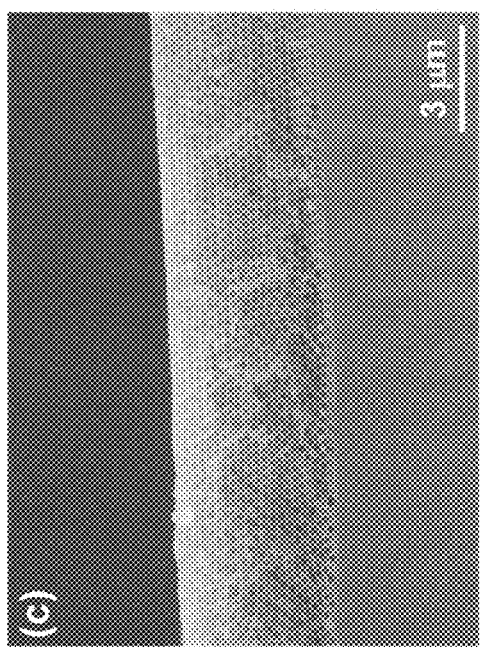
FIG. 3.3A
FIG. 3.3B
FIG. 3.3C
FIG. 3.3D

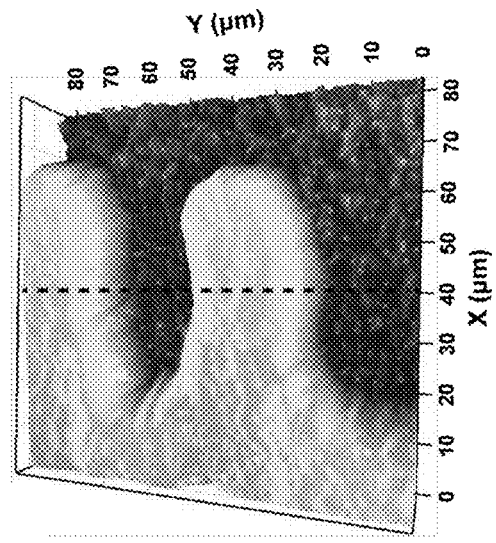
FIG. 3.4A
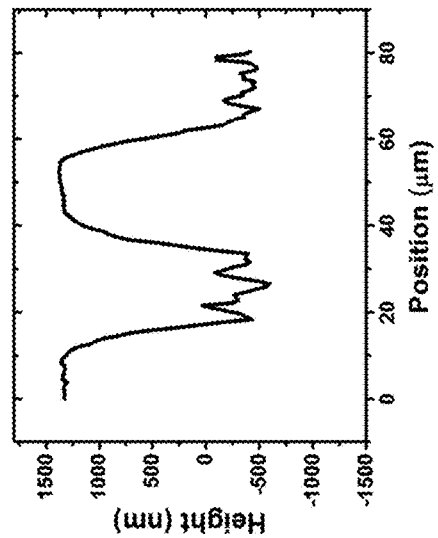
FIG. 3.4B
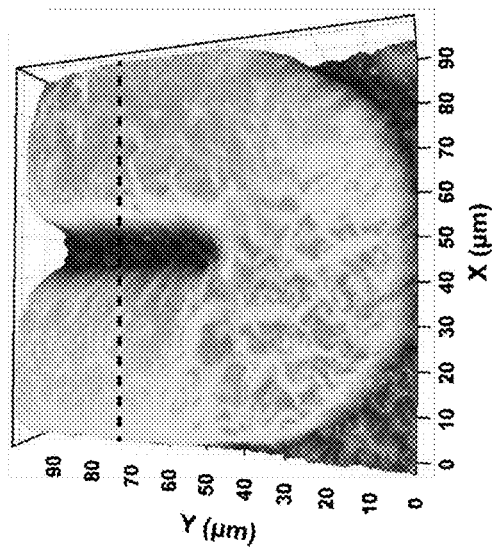
FIG. 3.4C
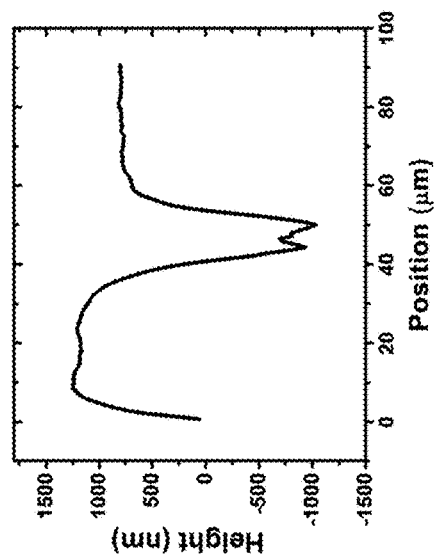
FIG. 3.4D

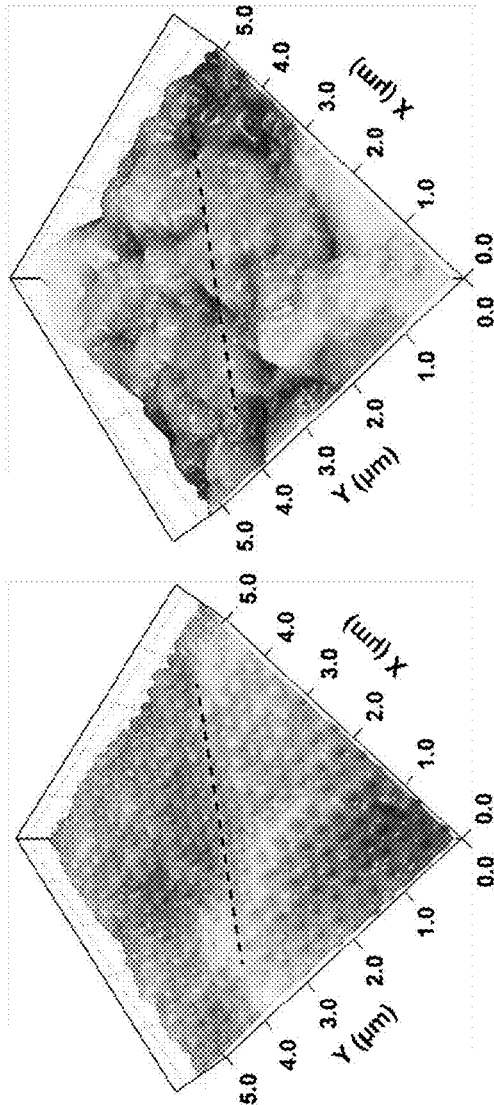
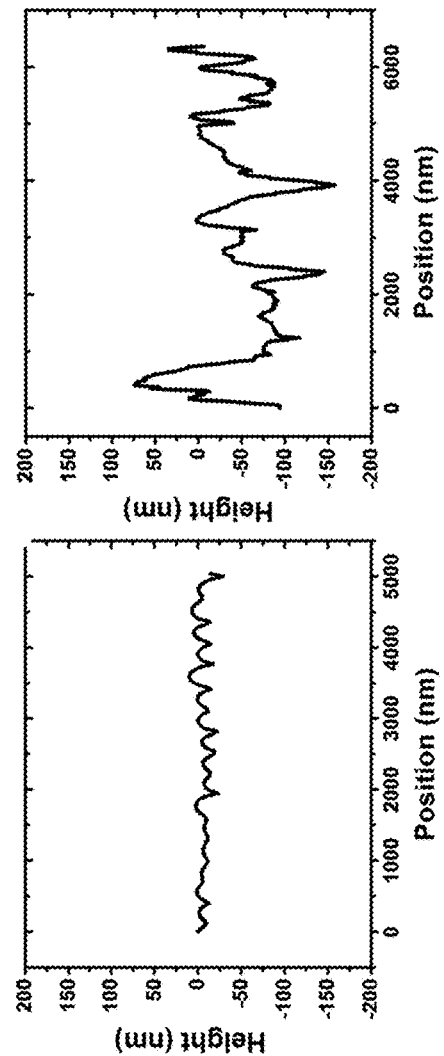
FIG. 3.5B
FIG. 3.5D
FIG. 3.5A
FIG. 3.5C

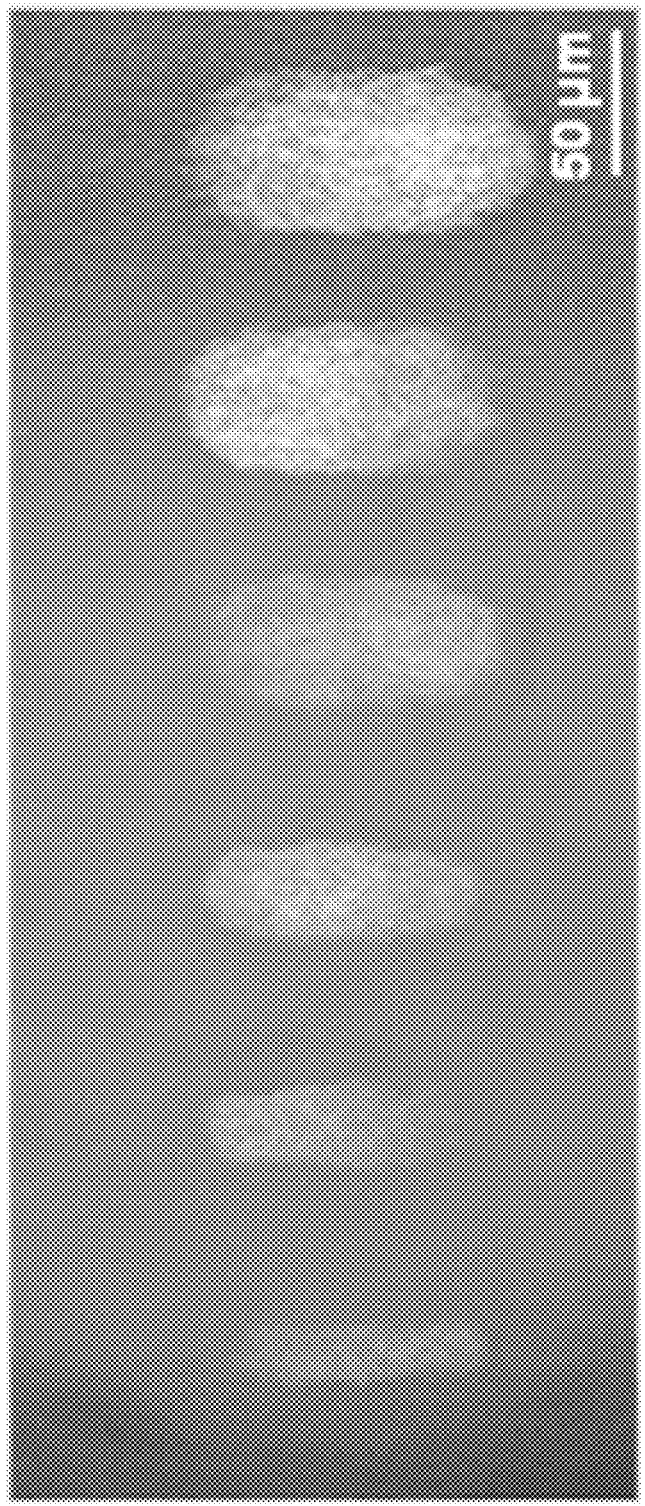
FIG. 3.6A

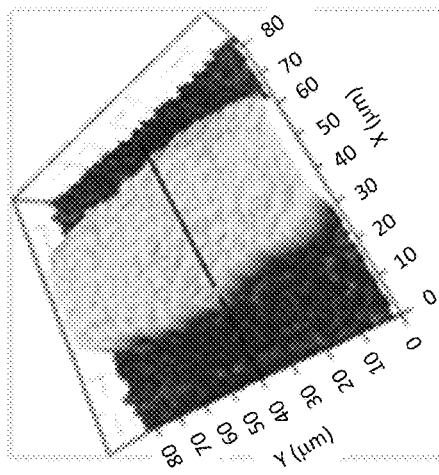
FIG. 3.6D
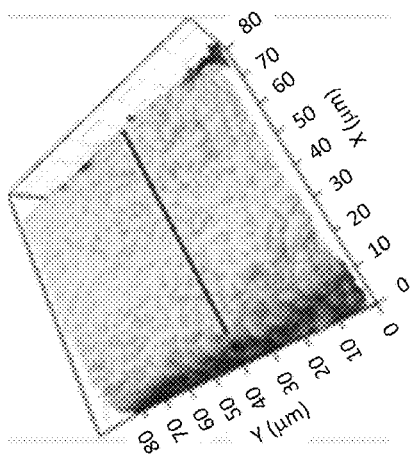
FIG. 3.6G
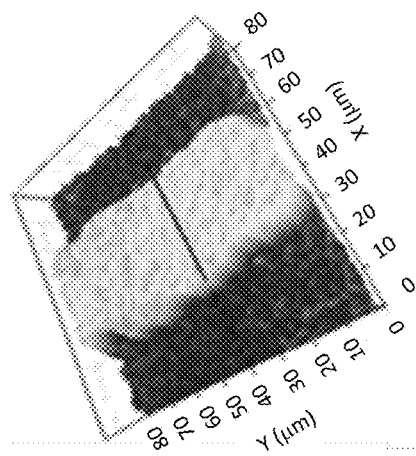
FIG. 3.6C
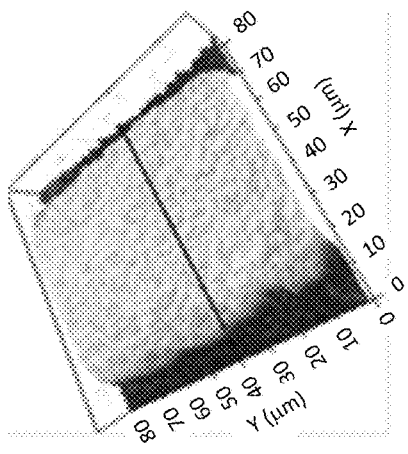
FIG. 3.6F
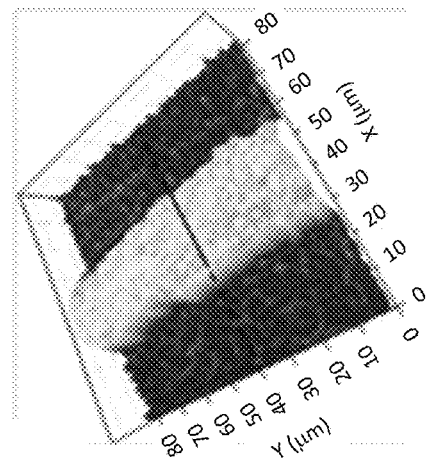
FIG. 3.6B
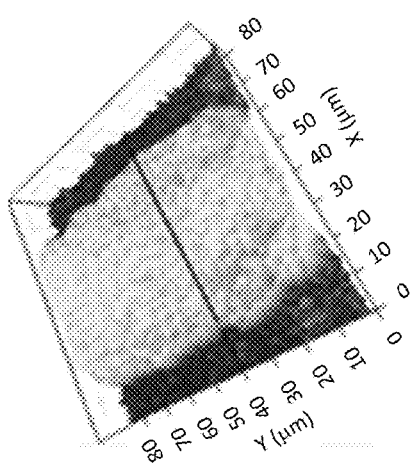
FIG. 3.6E

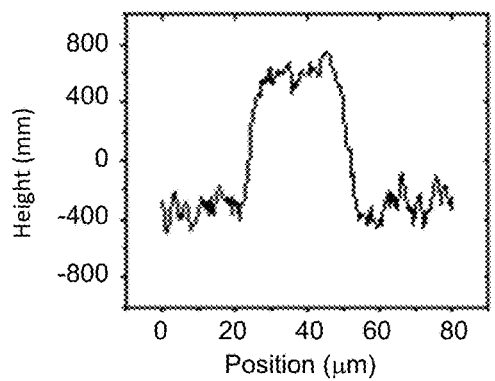
FIG. 3.6H
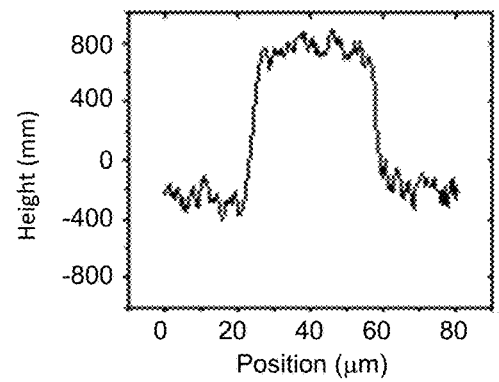
FIG. 3.6I
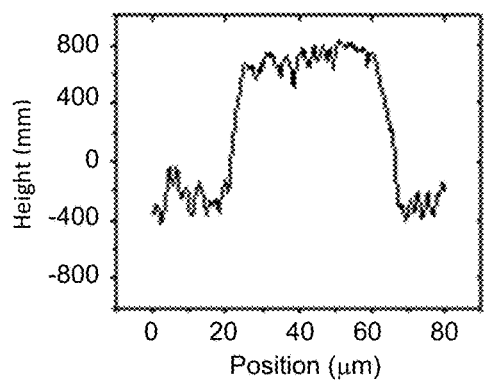
FIG. 3.6J
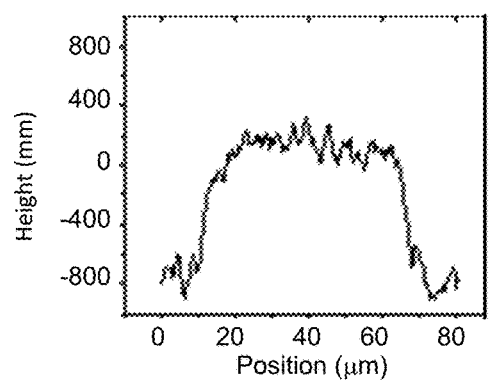
FIG. 3.6K
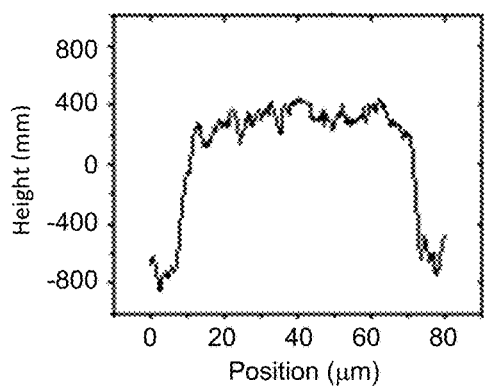
FIG. 3.6L
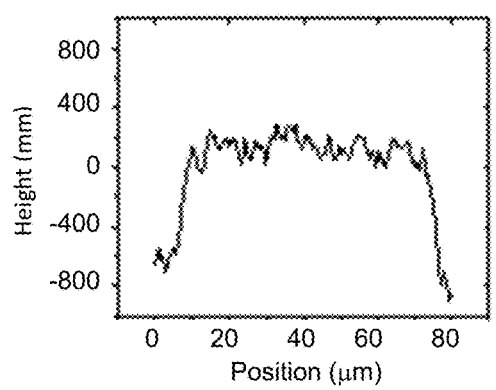
FIG. 3.6M

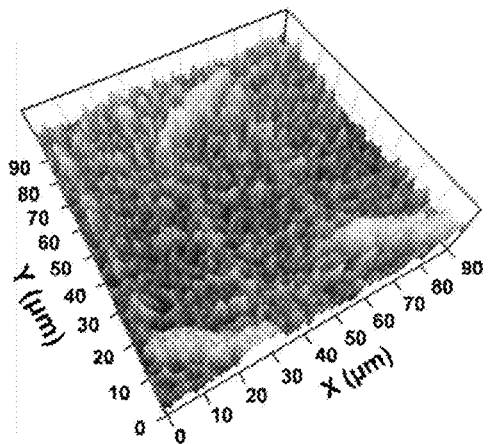
FIG. 3.7A
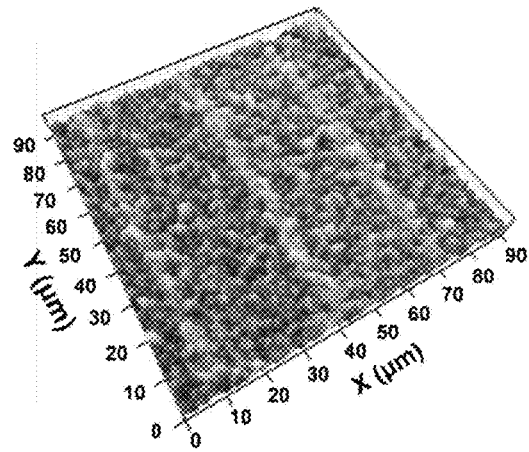
FIG. 3.7B
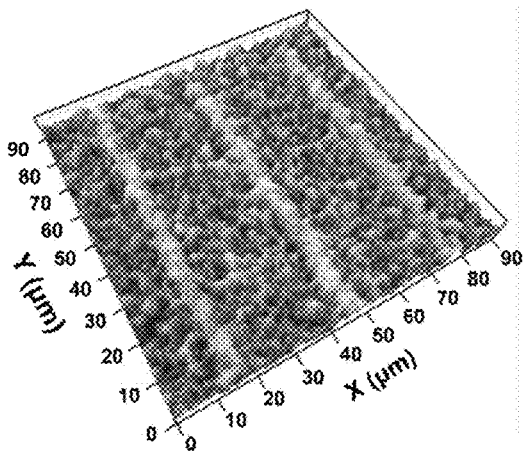
FIG. 3.7C
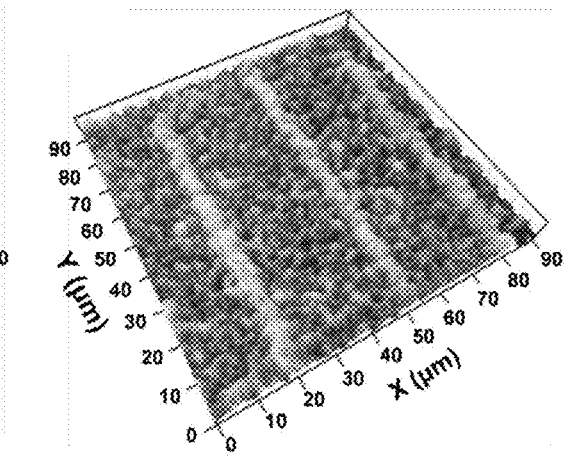
FIG. 3.7D

POROUS POLYMER MEMBRANES, METHODS OF MAKING, AND METHODS OF USE

CLAIM OF PRIORITY TO RELATED APPLICATION

This application is a Continuation-in-Part of PCT application having serial number PCT/US2014/063172, entitled "POROUS POLYMER MEMBRANES, METHODS OF MAKING, AND METHODS OF USE" filed on Oct. 30, 2014, where the PCT application claims priority to U.S. provisional application entitled "POROUS POLYMER MEMBRANES, METHODS OF MAKING, AND METHODS OF USE" having Ser. No. 61/897,848, filed on Oct. 31, 2013, which is entirely incorporated herein by reference.

STATEMENT REGARDING FEDERALLY SPONSORED RESEARCH OR DEVELOPMENT

This invention was made with Government support under NNX14AB07G awarded by the National Aeronautics and Space Administration. The Government has certain rights to this invention.

BACKGROUND

Shape memory polymers are a class of "smart" materials that can memorize and recover their permanent shapes in response to an external stimulus, such as heat, light, solvent, electricity, and magnetic fields.[1-15] They have been extensively exploited for a wide spectrum of technological applications, like smart surgical stents and sutures,[16-17] implants for minimally invasive surgery,[18-19] aerospace morphing structures,[20-22] sensors and actuators,[23-24] and self-healing materials.[25] Compared with their alloy counterparts (e.g., nitinol alloy), SMPs have gained increased attention due to their dramatically larger strain storage and recovery (up to 800% vs. less than 8%), low cost, light weight, ease of synthesis, and biocompatibility.[1-2,6-9] Shape memory (SM) is typically achieved in a three-step process that includes programming, storage, and recovery. Programming involves deforming a sample from its permanent shape to a temporary shape. This is usually done above the polymer glass transition temperature ($T_g$) to take advantage of the compliant nature of SMPs at high temperature. Once the sample has been deformed, it is cooled below $T_g$ to "freeze" in the temporary shape, which is due to restricted polymer chain mobility. Recovery occurs when the sample is heated to the vicinity of $T_g$, which increases chain mobility and allows the polymer to return to its permanent shape via entropy elasticity.[6-9]

The recovery time for thermoresponsive SMPs which are mostly studied and employed in practical devices is usually long—on the order of minutes.[7-9] This greatly impedes many applications that require fast response speed. Similar slow response is also suffered by other types of SMPs activated through lasers,[26] electricity,[27] infrared absorption,[28] and alternating magnetic fields.[29] Indeed, most of these different SM activation mechanisms are still thermoresponsive as they depend on the generation of heat to trigger the final shape recovery. Additionally, "hot" programming (i.e., heating SMP above a transition temperature such as $T_g$ and then deforming to a temporary configuration) is generally utilized by almost every class of SMPs.[1-15] By contrast, SMPs that can be "cold" programmed (i.e., programming at or below ambient temperature), which could provide a wide degree of processability to accommodate broader application requirements (e.g., operating at ambient conditions), are rare.[30-31] Moreover, most of current SMP applications focus on leveraging the macroscopic SM effect, where the deformation length-scale is large (on the order of centimeters). Thus, there is a need to overcome these deficiencies.

SUMMARY

In accordance with the purpose(s) of the present disclosure, as embodied and broadly described herein, embodiments of the present disclosure, in one aspect, relate to porous polymer membranes, structures including porous polymer membranes, devices including porous polymer membranes, methods of using porous polymer membranes, methods of making porous polymer membranes, and the like.

An embodiment of the present disclosure provides for a structure, among others, that includes: a porous polymer membrane including an ordered array of voids, wherein the distance between at least two pairs of adjacent voids is substantially the same, wherein a polymer framework separates the voids, wherein when the voids are in a collapsed state the porous polymer membrane is substantially clear, wherein when the voids are in an uncollapsed state the porous polymer membrane has an iridescent color, wherein upon pressure to an area of the collapsed voids, the collapsed voids renew their uncollapsed state, and/or wherein upon exposure to an area of the collapsed void to a solvent, the collapsed voids renew their uncollapsed state.

An embodiment of the present disclosure provides for a method of making a structure, among others, that includes: disposing nanoparticles onto a surface to form an array of nanoparticles; introducing a prepolymer mixture to the array of nanoparticles; polymerizing the prepolymer mixture to form a polymer framework around the array of nanoparticles; and removing the nanoparticles to form an ordered array of voids to form a porous polymer membrane, wherein the distance between at least two pairs of adjacent voids is substantially the same, wherein the polymer framework separates the voids, wherein when the voids are in a collapsed state the porous polymer membrane is substantially clear, wherein when the voids are in a uncollapsed state the porous polymer membrane has an iridescent color.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 1.1A-B illustrate a photograph of a macroporous ETPTA/PEGDA copolymer membrane (FIG. 1.1A) before fingerprinting and (FIG. 1.1B) after fingerprinting.

FIGS. 1.2A-C illustrates typical SEM images of (FIG. 1.2A) Top-view of a fingerprinted ETPTA/PEGDA copolymer. FIG. 1.2B illustrates cross-section view of a fingerprinted area showing the change of height of a peak-valley transition region. FIG. 1.2C cross-sectional view of a fingerprinted area.

FIG. 1.3 illustrates a photograph of a macroporous ETPTA/PEGDA membrane with printed "light bulb" pattern using a rubber stamp at room temperature.

FIG. 1.4 illustrates a photograph of a macroporous ETPTA/PEGDA membrane with hand-written "FLORIDA" using a traditional pen with ethanol as the ink.

FIG. 1.5 illustrates a specular optical reflection spectra obtained from a plain ETPTA/PEGDA copolymer with collapsed voids, a fingerprinted sample, and an ethanol-treated sample.

FIGS. 1.6A-B illustrate a comparison of two nanoporous ETPTA/PEGDA co-polymer films with (FIG. 1.6A) collapsed nanopores (dried out of water) and (FIG. 1.6B) open nanopores (dried out of ethanol).

FIGS. 1.7A-B illustrate a comparison of specular transmission spectra for a nanoporous ETPTA/PEGDA membrane cyclically dried out of water and ethanol. FIG. 1.7B illustrates a comparison of transmission at 600 nm for the spectra in (FIG. 1.7A).

FIG. 1.8, Scheme 2 is an illustration of the templating procedures for making macroporous polymer membranes by using self-assembled silica colloidal crystals as structural templates.

FIGS. 2.1A-F are a schematic illustration compares the SM effects between a traditional thermoresponsive SMP and the new stimuli-responsive SMP. 2.1A, A bulk SMP sample can be deformed into a temporary shape by a "hot" programming process (at a temperature above a specific $T_{trans}$). 2.1B, The temperature is cooled below $T_{trans}$ to "freeze" in the temporary shape. 2.1C, The recovery of the permanent shape can be triggered by applying heat ($T>T_{trans}$) to the strained SMP sample. 2.1D, A thin (a few µm thick) macroporous SMP photonic crystal with 3-D ordered macropores (permanent shape) shows strong Bragg diffraction of visible light. 2.1E, The ordered macropores can be deformed to a disordered structure (temporary shape) with no Bragg diffraction induced by an autonomous "cold" programming process (water drying) at ambient conditions. 2.1F, The nanoscopic recovery of the permanent 3-D photonic crystal structure can be stimulated by drying the sample out of ethanol or applying an external contact pressure.

FIGS. 2.2A-D illustrate the structural, thermal, and mechanical properties of the new pressure-responsive SMPs. 2.2A, Molecular structures of ETPTA (x+y+z=20) and PEGDA (x=12) oligomers. 2.2B, DSC plot of a macroporous ETPTA-co-PEGDA copolymer with 1:3 ratio. 2.2C, Typical force-depth indentation curve used to measure elastic properties of SMP. 2.2D, Average Young's moduli for PEGDA, ETPTA-co-PEGDA copolymer with 1:3 ratio, and ETPTA polymers.

FIGS. 2.3A-I illustrate the abitrary photonic crystal patterns printed on the new pressure-responsive SMP membranes. 2.3A, Photograph of a translucent macroporous SMP film with disordered macropores. 2.3B, Cross-sectional SEM image of the macroporous sample in a with deformed macropores. 2.3C, Photograph of a green-colored fingerprint pressed on the sample in 2.3A. 2.3D, Cross-sectional SEM image of an iridescent region in c with 3-D ordered macropores (300 nm diameter). 2.3E, Photograph of an iridescent "light bulb" pattern printed on a translucent macroporous SMP membrane templated from 300 nm silica microspheres. 2.3F, Photograph of the rubber stamp used in generating the "light bulb" pattern in 2.3E. 2.3G, Optical microscope image of micropatterned pairs of double lines on a macroporous SMP membrane. 2.3H, 2.3I, 3-D AFM image and the height profile of a section of a line in 2.3G.

FIGS. 2.4A-F illustrate the difference in topography and PBGs between a macroporous SMP membrane dried out of water and ethanol. 2.4A and C, 3-D AFM image and the height profile scanned across the profile line for a water-dried SMP sample consisting of 280 nm macropores. 2.4B and D, 3-D AFM image and the height profile for the same sample dried out of ethanol. 2.4E, Cross-sectional SEM image of the sample in 2.4B. 2.4F, Normal-incidence optical reflection spectra compares the PBG properties of the macroporous samples dried out of water and ethanol. The SWA-simulated spectrum assuming a perfect macroporous crystalline lattice is also shown to compare with the experimental results.

FIGS. 2.5A-D illustrate pressure-dependent macropore recovery. 2.5A, Normal-incidence optical reflection spectra obtained from a macroporous SMP membrane consisting of 280 nm macropores under different pressures. The same sample dried out of ethanol was labeled as "Full Recovery". 2.5B, Normalized absolute reflection amplitude of a recovered SMP sample was used as an indicator of the nanoscopic SMP strain recovery rate under different pressures. 2.5C and D, Cross-sectional SEM images of a macroporous SMP membrane recovered by 7.13 and 27.9 kPa pressure, respectively.

FIG. 2.6 illustrates macropore recovery induced by pull-off forces. A typical indentation force-displacement curve showing approach and retraction segments and pull-off force obtained on a macroporous SMP membrane. Inset shows diagram of macropore recovery during retraction of indenter due to pull-off force caused by van der Waals interactions and the capillary force induced by the capillary-condensed water meniscus layer between the indenter tip and the SMP membrane.

FIGS. 3.1A-D illustrates: (3.1A) Photograph of a rubber stamp with a "⁺A" relief pattern on its surface. (3.1B) Photograph of an iridescent "A⁺" pattern printed on a translucent macroporous SMP membrane with 280 nm macropores. (3.1C) Cross-sectional SEM image showing the translucent region in (3.1B). (3.1D) Cross-sectional SEM image showing the iridescent region in (3.1B).

FIG. 3.2 is a schematic illustration showing the direct writing of microscopic 3D photonic crystal patterns (letters "U" and "F") on a macroporous SMP membrane with collapsed macropores using an AFM tip.

FIGS. 3.3A-D illustrate: (3.3A) Photograph of a green-colored, handwritten "UF" pattern on a translucent macroporous SMP membrane with collapsed 300 nm macropores. (3.3B) Typical cross-sectional SEM image of the translucent region in (3.3A). (3.3C) Typical cross-sectional SEM image of the iridescent region in (3.3A). (3.3D) Normal-incidence optical reflection spectra obtained from the iridescent and the translucent regions of the sample in (3.3A). The simulated spectrum using a SWA model is also shown to compare with the experimental results.

FIGS. 3.4A-D illustrate: (3.4A) AFM image of a micropattern "U" directly written on a macroporous SMP membrane using a 1 mm diameter sapphire spherical tip. (3.4B) AFM image of a micropattern "F". (3.4C) Height profile scanned across the dashed line in (3.4A). (3.4D) Height profile scanned across the dashed line in (3.4B).

FIGS. 3.5A-D illustrate: (3.5A) Higher resolution AFM image of a recovered area on the micropatterned letter "U" in FIG. 3.4A. (3.5B) Higher resolution AFM image of an unpatterned area. (3.5C) Height profile scanned across the dashed line in (3.5A). (3.5D) Height profile scanned across the dashed line in (3.5B).

FIGS. 3.6A-M illustrate: (3.6A) Optical microscope image of microscopic lines written with increasing forces from left to right. (3.6B-G) AFM images of the lines (from left to right) in (3.6A). (3.6H-M) Height profiles scanned across the dashed lines in (3.6B)-(3.6G).

FIGS. 3.7A-D illustrate: AFM images of nanoscopic lines written with different AFM tip speeds. (3.7A) 0.2 µm/s. (3.7B) 1 µm/s. (3.7C) 5 µm/s. (3.7D) 20 µm/s.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of environmental engineering, biology, chemistry, materials science, mechanical engineering, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by volume, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequences where this is logically possible.

It must be noted that, as used in the specification and the appended claims, the singular forms "a," "an," and "the" include plural referents unless the context clearly dictates otherwise. Thus, for example, reference to "a compound" includes a plurality of compounds. In this specification and in the claims that follow, reference will be made to a number of terms that shall be defined to have the following meanings unless a contrary intention is apparent.

DISCUSSION

In accordance with the purpose(s) of the present disclosure, as embodied and broadly described herein, embodiments of the present disclosure, in one aspect, relate to porous polymer membranes, structures including porous polymer membranes, devices including porous polymer membranes, methods of using porous polymer membranes, methods of making porous polymer membranes, and the like.

In an embodiment, the porous polymer membrane can be used as a pressure-responsive shape memory polymer, where the mechanical properties of the porous polymer membrane can be tuned by controlling the ratio of the co-polymers used to form the porous polymer membrane. In particular, the porous polymer membrane includes an array of voids that are in a collapsed state (e.g., the volume of the void is reduced close to 0) or a disordered state (e.g., the voids are not highly ordered in three-dimension), and when a pressure or solvent is applied to an area of the porous polymer membrane, the collapsed or disordered voids recover in that area return to their uncollapsed or highly ordered state or fully formed state (e.g., having maximum void volume). In this way, the porous polymer membrane can take on the shape of what caused the pressure (e.g., a finger print touch) or where the solvent was controllably disposed on the porous polymer membrane. In addition, when the voids are in a collapsed state, the porous polymer membrane is substantially transparent (e.g., a pale white color) or transparent, while when the voids have recovered from the collapsed state, the porous polymer membrane has an iridescent color that can be tuned by altering the volume of the voids. In an embodiment, the porous polymer membrane has shape memory characteristics and tunable diffraction properties. An embodiment of the present disclosure provides for a SMP that enables unusual "cold" programming and instantaneous shape recovery triggered by applying an external pressure or exposing to an organic solvent (e.g., ethanol) at ambient conditions.

An advantage of an embodiment of the present disclosure is that the process for making the porous polymer membranes is simple, scalable, and inexpensive. In addition, embodiments of the present disclosure can be used in applications such as tunable diffractive optical devices, finger printing for biometric recognition (e.g., with both shape recognition and color change), tunable anti-glare coatings, biomedical devices (e.g., tunable polymer stents), pressure/vapor sensors, aerospace morphing structures, and the like.

In an embodiment, the porous polymer membrane can include an ordered three dimensional array of voids, where a polymer framework separates the voids. As mentioned above, the porous polymer membrane is substantially transparent or semi-transparent when the voids are in a collapsed or a disordered state. And the porous polymer membrane has an iridescent color that can be changed by altering the volume of the voids when the voids have recovered from the collapsed state. In an embodiment, the void can be collapsed by drying the voids after formation or exposing the voids to water and then evaporating the water from the porous polymer membrane. The voids collapse due to capillary forces when the water evaporates.

In an embodiment, the collapsed voids can be renewed by applying pressure to an area of the porous polymer membrane. In an embodiment, one area of the porous polymer membrane has pressure applied to it, while another area does not have pressure applied to it. The voids are renewed in the area having the applied pressure, while the voids are not renewed in areas where no pressure was applied. In addition, the areas that had pressure applied to it have an iridescent color, while the other areas do not.

In an embodiment, the collapsed voids can be renewed by exposing an area of the porous polymer membrane to a solvent such as methanol, ethanol, isopropanol, acetone, butanol, and a combination there. In an embodiment, one area of the porous polymer membrane is exposed to a solvent, while another area is not exposed to a solvent. The voids are renewed in the area exposed to the solvent, while the voids are not renewed in areas not exposed to the solvent. In addition, the areas exposed to the solvent have an iridescent color, while the other areas do not.

The thickness of the porous polymer membrane varies depending on the state of the voids and the number of voids along a plane perpendicular to the length of the porous polymer membrane. In an embodiment the porous polymer membrane can have a thickness of about 1 micrometer to 300 micrometers.

In an embodiment, the polymer framework can include a co-polymer of a pair of acrylate monomers that have low glass transition temperatures ($T_g$<room temperature). In an embodiment, the polymer framework is a co-polymer of ethoxylated trimethylolpropane triacrylate (ETPTA) and polyethylene glycol diacrylate (PEGDA), the structures of which are shown in Example 1. Both ETPTA and PEGDA are flexible at room temperature. The mechanical properties (e.g., rigidity and strength) of the resulting co-polymers can be tuned by controlling the ratio of these two monomers. A higher ratio of PEGDA leads to a softer polymer. In an embodiment, the ratio of ETPTA and PEGDA can be about 1:2 to 1:6.

In an embodiment, the porous polymer membrane can include an ordered array of voids. In an embodiment, the voids can be stacked directly on top of one another or the stacking can be offset. In an embodiment, the thickness of the porous polymer membrane can include about 1 to 100 monolayers of voids.

In an embodiment, the distance between at least two pairs of adjacent voids is substantially the same (e.g., about 100 nm to 1000 nm). In an embodiment, the number of unique pairs can be about 10, 100, 1000, 10,000, 100,000, 1,000, 000, 100,000,000, 100,000,000, to about 10, 100, 1000, 10,000, 100,000, 1,000,000, 100,000,000, 100,000,000, $1\times10^{10}$, $1\times10^{12}$, $1\times10^{15}$, $1\times10^{17}$, or $1\times10^{20}$ and any set of ranges (e.g., about 10,000 to 100,000, about 100 to $1\times10^{10}$, etc.) within these numbers or subranges (e.g., about 15 to 200,000, 2,500,000 to $3\times10^{12}$, etc.) within these numbers.

In an embodiment, the distance between each pair of adjacent voids is substantially the same. In an embodiment, the distance between a portion of the pairs of adjacent voids is substantially the same. In an embodiment, the "portion" can be about 50% or more, about 60% or more, about 70% or more, about 80% or more, about 90% or more, about 99% or more, or about 100%, over a defined area of the porous polymer layer. In an embodiment, the defined area can include about 50% or more, about 60% or more, about 70% or more, about 80% or more, about 90% or more, about 95% or more, about 99% or more, or about 100%, of the area of the porous polymer layer. The term "substantially" in these contexts can mean about 50% or more, about 60% or more, about 70% or more, about 80% or more, about 90% or more, about 99% or more, or about 100%. The term "adjacent" refers to two voids next to one another without a void separating them in the same porous polymer membrane.

In an embodiment, a polymer framework separates the voids. In an embodiment, the diameter of substantially all of the voids can be substantially equivalent. In an embodiment, the diameter is about 0.03 micrometers to 10 micrometers. The term "substantially" in this context can mean about 50% or more, about 60% or more, about 70% or more, about 80% or more, about 90% or more, about 99% or more, or about 100%.

In an embodiment, two sets of voids of different diameters can be present that form an ordered array of voids. In an embodiment, a first set of a pair of voids has a first diameter and a second set of a pair of voids has a second diameter, where the first diameter and the second diameter are not the same. The ordered array of voids can have a plurality of first sets and second sets. In another embodiment, the porous polymer membrane can include three or more sets of such voids each having different diameters.

In an embodiment, the porous polymer membrane is formed by disposing nanoparticles onto a surface to form an array of nanoparticles. In an embodiment, a monomer mixture can be disposed on a surface using capillary forces (See Example) or using a process such as a doctor blade coating process, tape casting, or applying a simple shear force by two plates with a controlled gap in between. The nanoparticles can be aligned in a three dimensional ordered colloidal crystal array, e.g., the particles can be located in crystalline lattices of, for example, a face-centered cubic (f.c.c.), hexagonal-centered cubic (h.c.p.) crystals, or the like. After the monomer mixture is disposed on the nanoparticle array, the monomer mixture can be polymerized to form a co-polymer membrane having nanoparticles disposed in the polymer membrane. In an embodiment, the polymerization can be photopolymerization, thermopolymerization, or a combination thereof.

Subsequently, a portion (e.g., about 50%, 60%, 60%, 80%, 90%, 95%, 99% or more, or about 100%) or all of the nanoparticles can be removed to form the porous polymer membrane. In an embodiment, the nanoparticles can be removed by a process that does not alter the polymer. The type of process used to remove the nanoparticles depends, at least in part, upon the type of nanoparticle and the polymer. In an embodiment, the porous polymer membrane is formed by dissolving the nanoparticles using an acid solution such as, but not limited to, hydrofluoric acid (e.g., for silica nanoparticles). The porous polymer membrane including an array of voids is formed once the nanoparticles are removed.

As mentioned above, the voids are made from the removal of one or more nanoparticles. In an embodiment, the nanoparticles are disposed on top of one another in the polymer membrane, and when the nanoparticles are removed, a void is formed in the place of each nanoparticle. In an embodiment, the voids are distinct from one another and in another embodiment the voids are interconnected to form interconnected volumes that can form channels within and/or through the porous polymer membrane.

In an embodiment the monomer mixture can include two or more acrylate monomers such as those described herein, wherein each monomer can be about 5 to 95 weight percent of the monomer mixture. In an embodiment the prepolymer mixture can include an ethoxylated trimethylolpropane triacrylate (ETPTA) and a polyethylene glycol diacrylate (PEGDA). In an embodiment, the volumetric ratio of ETPTA to PEGDA can be about 1:1 to 1:10 or about 1:2 to 1:6. In addition, the monomer mixture can include a polymer initiating agent such as a photoinitiator (e.g., 2-hydroxy-2-methyl-1-phenyl-1-propanone, azobisisobutyronitrile, or and 2,2-dimethoxy-2-phenylacetophenone). The amount of initiator used depends upon the polymerization process, the monomers, and the like.

Once the monomer is polymerized, a polymer framework is formed around the nanoparticles. After the nanoparticles are removed, the polymer framework supports the porous polymer membrane. The mechanical characteristics of the polymer framework can be controlled by selection of the monomers, the ratio of the monomer, and the like. The dimensions of the polymer framework can be controlled by the process of disposing the monomer/nanoparticle mixture on the substrate. In an embodiment, the thickness of the polymer framework between adjacent nanoparticles can be about 100 nm to 1000 nm.

In an embodiment, the nanoparticles can be of the same or different type and/or same or different size, depending on the use or purpose of the porous polymer membrane. The selection of the type nanoparticle can depend upon the process for removing the nanoparticle, the type of polymer, and/or polymer framework. The selection of the size can depend upon the process for removing the nanoparticles, the type of polymer, the polymer framework, the diameter of the desired voids and channel, and the like. In an embodiment, two or more different types and/or sizes of nanoparticles can be selected. In an embodiment, two or more processes can be used to remove nanoparticles (e.g., when two or more types of nanoparticles are used in the monomer/nanoparticle mixture). The type of nanoparticle can include silica nanoparticles, polymer latex nanoparticles, titania nanoparticles, CdSe nanoparticles, and other nanoparticles where the type selected has a uniform diameter. In an embodiment, the nanoparticles can have a diameter of about 100 to 1000 nm or about 200 to 500 nm.

Once the nanoparticles have been removed, the voids can be collapsed by exposing the porous polymer membrane to water and then evaporating the water. Capillary forces will cause the voids to collapse. It should also be noted that once the voids are renewed so that they are not collapsed, exposing the voids to water and then evaporating the water will cause the voids to collapse again. Thus, the porous polymer membrane can be renewed.

EXAMPLES

Now having described the embodiments of the present disclosure, in general, example 1 describes some additional embodiments of the present disclosure. While embodiments of the present disclosure are described in connection with example 1 and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

Shape memory polymers (SMPs) are a class of "smart" materials that offer mechanical actions triggered by an external stimulus, such as heat, light (e.g., ultraviolet light), solvent, and electromagnetic fields. These materials have the ability to "memorize" a macroscopic permanent shape, be manipulated and fixed to a temporary shape under specific conditions (e.g., at a specific temperature), and then later relax to the original, stress-free conditions under various external commends. They have found important technological applications in a spectrum of fields ranging from smart biomedical devices to self-healing materials. Although pressure is an important parameter in many industrial processes, pressure-responsive SMPs are rare. In this Example a new type of SMP that can be triggered by a small pressure change and/or a solvent is described.

The chemical compositions of pressure-sensitive SMPs can vary depending on the desired characteristics of the SMP. In an embodiment, the composition can include various volumetric ratios of two monomers—ethoxylated trimethylolpropane triacrylate (ETPTA) and polyethylene glycol (600) diacrylate (PEGDA). These two chemicals are both from Sartomer and their product numbers are SR 415 and SR 610. Their molecular structures are shown in Scheme 1. The glass transition temperature of the corresponding polymers is −40° C. for ETPTA and −42° C. for PEGDA. The volumetric ratio of ETPTA to PEGDA can be varied from 1:2 to 1:6. 0.5% (weight) Darocur 1173 (2-hydroxy-2-methyl-1-phenyl-1-propanone) is added to the monomer mixture as the photoinitiator. The monomers can be easily photopolymerized by exposed to ultraviolet radiation by using a pulsed UV curing system (RC 742, Xenon). The mechanical properties (e.g., rigidity) of the resulting copolymers can be tuned by controlling the ratio of these two monomers. A higher ratio of PEGDA leads to a softer polymer.

Scheme 1. Chemical structures of ETPTA (A) and PEGDA (B).

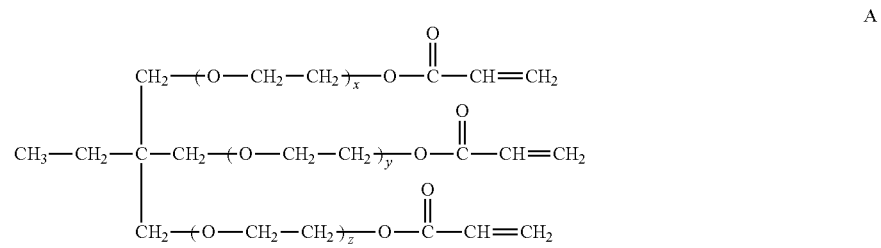

A

-continued

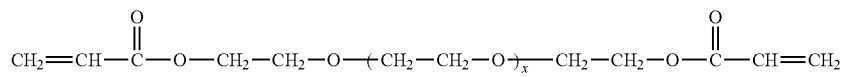

B

The discovery of the pressure-responsive shape memory properties of the ETPTA/PEGDA co-polymers is based on macroporous co-polymer membranes prepared by a colloidal crystal templating technology. Scheme 2 (FIG. 1.8) shows the illustration of the templating procedures for making macroporous ETPTA/PEGDA films. A silica colloidal crystal having monodispersed 300 nm silica particles is first assembled by a convective self-assembly technology on the surface of a glass microslide. A sandwich cell is then assembled by covering the silica colloidal crystal-coated glass substrate with another glass microslide. The ETPTA/PEGDA monomer mixture is then introduced into the sandwich cell by capillary force. The monomers are then photopolymerized by UV radiation for 4 seconds. The two glass microslides and the silica particles can then be removed by dipping the sandwich cell in a 0.5 vol. % hydrofluoric acid aqueous solution for more than 4 hours. This results in the formation of self-standing macroporous co-polymer membranes after blow-drying the films.

The templated macroporous ETPTA/PEGDA membranes contain three-dimensionally ordered voids originated from the templating silica particles when the membranes are immersed in water. This is confirmed by the iridescent colors of the wet membranes caused by the Bragg diffraction of visible light form the 3-D ordered crystalline structure. However, the dried co-polymer membranes do not show iridescent colors (FIG. 1.1A). This is caused by the collapsing of the nanopores during the evaporation of water trapped into the voids. The strong capillary force induced by the large surface tension of water collapses the voids, making the final membranes nearly transparent. When the copolymer membrane is touched by a finger (a very small pressure is applied like in the typical finger printing process), a clear colorful fingerprint is left on the surface of the macroporous membrane (FIG. 1.1B). The color of the fingerprinted area is controlled by the void size of the templating silica particles. For instance, the sample in FIG. 1.1B templated from 300 nm silica spheres shows iridescent green color in the fingerprinted areas; while a sample consisting of 400 nm voids will show a red color.

The iridescent color of the fingerprinted areas is caused by the Bragg diffraction of visible light from the 3-D ordered voids in the templated macroporous membrane. This is confirmed by the scanning electron microscope images of the sample shown in FIG. 1.2A-C. FIG. 1.2A shows the top-view SEM image of the surface of a fingerprinted sample. The fingerprints are easily perceived from the image (similar to the optical microscope image shown in FIG. 1.1B). The contrast in SEM is coming from the height difference of the peaks and valleys of the fingerprinted areas. The cross-sectional SEM image in FIG. 1.2B is focused on a fingerprinted area. The gradual height change of the fingerprint is clearly evident in the image. The 3-D crystalline order of the 300 nm voids is shown by the cross-sectional SEM image in FIG. 1.2C. The SEM images in FIG. 1.2A-C explain the appearance of the iridescent colors produced by the fingerprinting process. As the ETPTA/PEGDA copolymers are pressure-responsive SMPs, the permanent shape of the original polymer during photopolymerization (i.e., spherical voids) is memorized during the void collapse caused by water evaporation. When a small pressure is applied, the pressure is sufficient to trigger the recovery of the temporary shape (collapsed voids) into the original one (spherical voids). However, the unpressed regions remain the temporary state, showing no iridescent color.

To further confirm the recovery of the spherical voids is caused by pressure instead of the body temperature of the finger, we used a rubber stamp with adjustable patterns to print the patterns onto the macroporous ETPTA/PEGDA membranes at room temperature. FIG. 1.3 shows the printed patterns using a small pressure (similar to the typical pressure used in common fingerprinting). The colorful "light bulb" pattern on the rubber stamp is clearly shown on the polymer surface.

Instead of pressure, we found that various solvents including methanol, ethanol, isoproponal, and acetone can also trigger the recovery of the collapsed voids into their original spherical shape. FIG. 1.4 shows a photograph of a macroporous ETPTA/PEGDA membrane with a handwritten "FLORIDA" using a traditional pen with pure ethanol as the ink. Further SEM examination (not shown here) demonstrates the 3-D ordering of spherical voids as the fingerprinted one shown in FIG. 1.2C.

The optical properties of the fingerprinted and ethanol-treated macroporous ETPTA/PEGDA membranes are evaluated using an ultraviolet/visible spectrometer. FIG. 1.5 compares the specular optical reflection spectra obtained from a plain co-polymer membrane with collapsed voids after drying out of water (see FIG. 1.1A), the fingerprinted region in FIG. 1B, and the ethanol-written region in FIG. 1.4. The collapsed sample does not show apparent diffraction peaks as the voids are collapsed. By contrast, the fingerprinted and the ethanol-treatment samples both show clear Bragg diffraction peaks around 510 nm. This corresponds well to the shining greenish color shown by both samples.

Besides the tunable diffraction properties shown by the pressure- and solvent-sensitive SMPs, which is highly useful for many tunable optical devices such as optical filters and tunable lasers, we further demonstrated another useful application of the novel SMPs in tuning optical reflection (for anti-reflection applications) by controlling the collapsing/opening of the templated voids. In this approach, monolayer colloidal silica nanoparticles with ~100 nm diameter are first self-assembled at an air/water interface and then the colloidal monolayers are transferred onto a glass surface. The same templating procedures as shown in Scheme 2 (FIG. 1.8) are then applied to make nanoporous ETPTA/PEGDA membranes. When the co-polymer films are dried out of water, the nanopores are collapsed due to large capillary forces, resulting in high optical reflection at the polymer/air interface. By contrast, by immersing the same film in ethanol and then dried in air, the voids retain the permanent spherical shape, leading to reduced optical reflection (and high optical transmission through the membrane). FIG. 1.6A-B compares the reflection from a SMP membrane with collapsed (dried out of water) and open (dried out of ethanol) nanopores. The good anti-glare performance of the film with open nanopores is evident. The membranes can be consecutively dried out of water and ethanol, resulting in cycling low and high optical transmission as shown in FIG. 1.7A-B.

In summary, we have discovered a new type of shape memory polymer that is a co-polymer of two acrylates. By controlling the ratio of these acrylates, the mechanical properties of the resulting co-polymers can be tuned. The recovery of the permanent shape of these novel SMPs can be easily triggered by applying a small pressure or using some specific solvents. The potential applications of this novel type SMP in tunable diffractive optical devices, color fingerprinting, and tunable anti-glare coatings have been demonstrated.

REFERENCES, EXAMPLE 1 AND THE BACKGROUND SECTION

1. A. Lendlein, Shape Memory Polymers (Springer, New York, N.Y., 2010).
2. W. M. Huang, B. Yang and Y. Q. Fu, *Polyurethane Shape Memory Polymers*. (CRC Press, Boca Raton, Fla., 2012).
3. D. Habault, H. Zhang and Y. Zhao, *Chem. Soc. Rev.* 42, 7244 (2013).
4. C. J. Kloxin and C. N. Bowman, *Chem. Soc. Rev.* 42, 7161 (2013).
5. H. Meng, et al., *Smart Mater. Struct.* 22 (2013).
6. C. Yakacki and K. Gall, *Adv. Polym. Sci.* 226, 147 (2010).
7. T. Xie, *Polymer* 52, 4985 (2011).
8. M. Behl, M. Y. Razzaq and A. Lendlein, *Adv. Mater.* 22, 3388 (2010).
9. A. Lendlein and S. Kelch, *Angew. Chem. Int. Ed.* 41, 2034 (2002).
10. C. Liu, H. Qin and P. T. Mather, *J. Mater. Chem.* 17, 1543 (2007).
11. P. T. Mather, X. Luo and I. A. Rousseau, "Shape Memory Polymer Research", in *Annu. Rev. Mater. Res.* (2009), Vol. 39, pp. 445.
12. H. Meng and J. Hu, *J. Intel. Mater. Syst. Str.* 21, 859 (2010).
13. T. D. Nguyen, C. M. Yakacki, P. D. Brahmbhatt and M. L. Chambers, *Adv. Mater.* 22, 3411 (2010).
14. M. A. C. Stuart, et al., *Nat. Mater.* 9, 101 (2010).
15. C. M. Yakacki, *Polym. Rev.* 53, 1 (2013).
16. A. Lendlein and S. Kelch, *Clin. Hemorheol. Microcirc.* 32, 105 (2005).
17. A. Lendlein and R. Langer, *Science* 296, 1673 (2002).
18. G. Baer, T. Wilson, D. Maitland and D. Matthews, *J. Invest. Med.* 54, S162 (2006).
19. C. M. Yakacki, et al., *Biomaterials* 28, 2255 (2007).
20. L. Ionov, *Polym. Rev.* 53, 92 (2013).
21. S. M. Felton, et al., *Soft Matter* 9, 7688 (2013).
22. L. Ionov, *Soft Matter* 7, 6786 (2011).
23. M. F. Metzger, et al., *Biomed. Microdevices* 4, 89 (2002).
24. W. Small, et al., *Opt. Express* 13, 8204 (2005).
25. H. Tobushi, H. Hara, E. Yamada and S. Hayashi, *Smart Mater. Struct.* 5, 483 (1996).
26. D. J. Maitland, et al., *Laser Surg. Med.* 30, 1 (2002).
27. J. Leng, H. Lv, Y. Liu and S. Du, *J. Appl. Phys.* 104, 104917 (2008).
28. H. Koerner, et al., *Nat. Mater.* 3, 115 (2004).
29. C. S. Hazelton, S. C. Arzberger, M. S. Lake and N. A. Munshi, *J. Adv. Mater.* 39, 35 (2007).
30. B. Heuwers, et al., *Macromol. Chem. Phys.* 214, 912 (2013).
31. B. Heuwers, et al., *Macromol. Chem. Phys.* 34, 180 (2013).
32. Z. Wang, et al., *Adv. Mater.* 23, 3669 (2011).
33. T. Xie, X. Xiao, J. Li and R. Wang, *Adv. Mater.* 22, 4390 (2010).
34. H. Xu, et al., *Adv. Funct. Mater.* 23, 3299 (2013).
35. C. M. Yakacki, et al., *Polymer* 52, 4947 (2011).

Example 2

Smart shape memory polymers (SMPs) can memorize and recover their permanent shape in response to an external stimulus, such as heat, light, and solvent. They have been extensively exploited for a wide spectrum of applications ranging from biomedical devices to aerospace morphing structures. However, most of the existing SMPs are thermo-responsive and their performance is hindered by heat-demanding programming and recovery steps. Although pressure is an easily adjustable process variable like temperature, pressure-responsive SMPs are largely unexplored. By integrating scientific principles drawn from two disparate fields—the fast-growing photonic crystal and SMP technologies, here we report a new type of SMP that enables unusual "cold" programming and instantaneous shape recovery triggered by applying a contact pressure at ambient conditions. Moreover, this interdisciplinary integration enables fabrication of reconfigurable photonic crystals and simultaneously provides a simple and sensitive optical technique for investigating the intriguing shape memory effects at nanoscale.

Shape memory (SM) in traditional SMPs is typically achieved in three steps including programming, storage, and recovery[1-6]. As shown by the scheme in FIG. 2.1A,B, programming involves deforming a bulk SMP sample from its permanent shape to a temporary configuration. This "hot" process is usually done above a specific transition temperature ($T_{trans}$), such as the polymer glass transition temperature ($T_g$), to leverage the compliant properties of SMPs at high temperature. Once the sample is deformed, it is cooled below $T_{trans}$ to "freeze" in the temporary shape (FIG. 2.1B). Recovery occurs when the sample is reheated to the vicinity of $T_{trans}$, which increases polymer chain mobility and allows the SMP to return to its permanent shape via entropy elasticity (FIG. 2.1C)[1]. Unfortunately, heat-demanding "hot" programming is generally utilized by almost every class of existing SMPs. By contrast, SMPs that can be "cold" programmed (i.e., deformed to a temporary shape at or below room temperature), which could greatly enhance the processability to accommodate broader application requirements (e.g., room temperature operations for the entire SM cycle), are rare[7,8]. Additionally, most of the current SMP applications focus on leveraging the macroscopic SM effects, where the deformation length scale is large (on the order of centimeters). However, an intriguing potential for all SMPs, largely unexplored, is their ability to memorize and change shape at nanoscale[9-14].

Results

Preparation and Characterization of New SMPs.

We discovered a new type of pressure-responsive SMP that enables "cold" programming and instantaneous, nanoscopic shape recovery at ambient conditions (FIG. 2.1D-F) in the fabrication of macroporous polymer photonic crystal membranes[15,16]. Photonic crystals are periodic dielectric structures with a forbidden photonic band gap (PBG) for electromagnetic waves[17-19]. They may hold the key to continued progress towards all-optical integrated circuits and high-speed optical computing[19]. The new SMPs are photocured copolymers of ethoxylated (20) trimethylolpropane triacrylate (ETPTA, $T_g \sim -40°$ C. provided by the vendor) and polyethylene glycol (600) diacrylate (PEGDA, $T_g \sim -42°$ C.) oligomers (see molecular structures in FIG. 2.2A) with varying volumetric ratios from 1:1 to 1:6. As the ETPTA-co-PEGDA copolymer with 1:3 ratio showed the optimal SM behaviors, this recipe was adopted throughout the current work if not explicitly stated otherwise. A single $T_g$ of $\sim -42°$ C. measured by differential scanning calorimetry (DSC, FIG. 2.2B) of a SMP sample indicates the crosslinked copolymer is a homogeneous mixture of the two components. The Young's moduli of the pure ETPTA and PEGDA polymers and their 1:3 copolymer were characterized by in-situ nanoindentation tests (see the typical force-depth indentation curve in FIG. 2.2C). The results in FIG. 2.2D show that the average Young's moduli for all samples are about 80 MPa. The tensile strength of the 1:3 copolymer membrane measured by using a conventional tensile tester is ~7.5 MPa and the yielding strain is ~0.19, indicating the copolymer is quite elastic at room temperature. The bulk Young's modulus is caculated to be ~39 MPa which is lower than the microscopic moduli measured by nanoindentation.

Unusual "Cold" Programming Caused by Water Evaporation.

Macroporous ETPTA-co-PEGDA membranes were fabricated by using self-assembled, three-dimensional (3-D) highly ordered silica colloidal crystals as structural templates[15]. After removing the templating silica microspheres by a hydrofluoric acid wash, the resulting macroporous copolymer film immersed in water exhibited iridescent colors caused by Bragg diffraction of visible light from the periodic arrays of polymer macropores. This confirmed the maintenance of the 3-D ordered structure of the original silica colloidal crystal. Surprisingly, the shining colors of the macroporous photonic crystal disappeared when the membrane was dried out of water and it became translucent with a pale white appearance (FIG. 2.3A). This suggests that the 3-D periodic structure was lost when water evaporated from the ordered macropores. The cross-sectional scanning electron microscope (SEM) image in FIG. 2.3B confirms this conjecture as no ordering of the deformed macropores is shown. Therefore, the new elastic copolymers enable an autonomous "cold" programming process—the deformation from a 3-D ordered permanent structure to a disordered temporary structure can be achieved at ambient conditions by evaporating water from the templated macropores. This is in sharp contrast to traditional SMPs that need to be heated above $T_{trans}$, then deformed to a temporary shape[1].

Pressure-Induced SM Recovery.

Even more interesting, the recovery of the permanent photonic crystal structure can also be triggered at room temperature simply by applying a small contact pressure on the macroporous membranes with collapsed macropores. As illustrated by the fingerprinting process, an iridescent green-colored fingerprint (FIG. 2.3C) immediately appeared on the translucent macroporous copolymer membrane templated from 300 nm silica microspheres. The cross-sectional SEM image in FIG. 2.3D shows a fingerprinted region with the vivid green color and the recovered 3-D highly ordered macroporous structure is evident. The difference in the surface microstructures between the fingerprint valleys and ridges was characterized by atomic force microscopy (AFM). The surface of the raised fingerprint ridges is apparently much smoother than that of the valleys as confirmed by the magnified AFM images and the surface roughness analysis. The raising height of the fingerprint ridges above the valleys is estimated to be ~1.5 μm by the AFM depth profile. The gradual transition from a disordered macroporous array in a fingerprint valley to a 3-D highly ordered structure in a fingerprint ridge is shown by the SEM.

To avoid possible body-temperature effects on the macropore recovery in the above fingerprinting process, as well as to verify the feasibility of a new printing-based technology for fabricating arbitrary photonic crystal patterns, we printed a "light bulb" relief pattern on a rubber stamp (FIG. 2.3F) onto a translucent SMP copolymer membrane with collapsed 300 nm macropores at room temperature. The final iridescent imprint (FIG. 2.3E) is a faithful replica of the original relief pattern. Furthermore, standard microfabrication technologies were used in making microscopic patterns on silicon wafers, which were used to imprint the micropatterns on SMP copolymer membranes. FIG. 2.3G shows an optical microscope image of printed pairs of parallel lines with ~30 μm width. The raising up of the smoother line patterns from the rough macroporous surface is clearly presented by the AFM image (FIG. 2.3H) and the corresponding depth profile (FIG. 2.3I). Although various technologies for fabricating tunable photonic crystals have been demonstrated using elastic materials (e.g., elastomers and gels), the temporarily deformed photonic microstructures cannot be memorized[18,20-23]. Immediately, they return to the original crystalline lattices once the external stress is released. By contrast, the printed photonic crystal patterns on the new pressure-responsive SMPs are stable over long periods of time. The colorful fingerprints (e.g., FIG. 2.3C) stored at ambient conditions have maintained their vivid colors and clear patterns for more than 2 years. Most importantly, the imprinted photonic crystal patterns can be erased when the SMP membranes are reimmersed in water, then dried out of it. New photonic microstructures can then be printed on the regenerated macroporous SMP membranes. This unique rewriting capability is critical for developing reconfigurable photonic crystals that can adapt various photonic functionalities to accommodate different applications[24,25]. This reconfigurability can dramatically reduce the complexity and fabrication cost of developing a large number of application-specific devices[26].

Capillary Pressure-Induced Macropore Collapse.

Above we have shown that the new SMP copolymers enable room temperature operations for the entire SM cycle (from an unusual "cold" programming process to a contact pressure-induced recovery step). We speculated that the "cold" programming process was induced by large capillary pressure created by water evaporation from the template macropores, which squeezed the elastic macropores into disordered arrays[27]. Similar macropore collapse was observed for macroporous polymer (e.g., polysulfone) reverse osmosis membranes used for water purification[28]. Further insight into the macropore collapse can be gained by considering the capillary pressure ($P_c$) in the Young-Laplace equation, $P_c = 2\gamma \cos \theta / r$, where $\gamma$ is the liquid/vapor surface tension, r is the radius of the pores, and $\theta$ is the contact angle (CA) of the liquid on the pore surface[27]. As the measured water CAs on the copolymers were less than 20°, cos θ is thus close to 1. One direct evidence supporting this capillary pressure-induced macropore collapse mechanism is that the templated macroporous membrane retained its original 3-D ordered structure and iridescent colors when dried out of ethanol, which has a smaller surface tension than that of water (22.39 mN/m vs. 72.75 mN/m at 20° C.). The smaller γ led to a lower $P_c$ that was not sufficient to squeeze the elastic macropores into disordered arrays. In addition to ethanol, a large variety of solvents with low surface tension (e.g., acetone and toluene) can also trigger the same disorder-to-order transition.

FIG. 2.4A-D compare the surface microstructures of a macroporous SMP copolymer membrane dried out of water (FIG. 2.4A,C) and ethanol (FIG. 2.4B,D), respectively. The rough, disordered macroporous array was fully recovered to a smooth and ordered structure triggered by ethanol evaporation (FIG. 2.4E). This disorder-to-order transition and the corresponding translucent-to-iridescent color change can be characterized by measuring the normal-incidence optical reflection spectra. In FIG. 2.4F, the sample with disordered macropores (dried out of water) shows no apparent PBG peaks; while the ethanol-recovered sample with ordered macropores exhibits a distinct PBG peak with well-defined Fabry-Perot fringes, indicating the high crystalline quality of the solvent-activated macroporous photonic crystal[15]. Importantly, the experimental spectrum of the recovered photonic crystal matches well with the calculated spectrum using a scalar-wave approximation (SWA) model[29], which assumes a perfect macroporous crystalline lattice. This indicates that the temporarily deformed macropores were fully reopened to their permanent, 3-D highly ordered structure triggered by ethanol evaporation.

Critical Contact Pressure for SM Recovery.

By using the ethanol-activated sample as a fully recovered control, we can estimate the critical pressure that is needed to trigger the shape recovery and the nanoscopic strain recovery rate ($R_r$) of the new SMPs through monitoring the PBG properties of the recovered samples under different pressures. FIG. 2.5A shows that different reflection amplitudes of the PBG peaks resulted when various pressures were applied by putting varying weights on a small polydimethylsiloxane (PDMS) piece with a specific area on a macroporous copolymer membrane. Previous work has shown that the PBG optical density of a macroporous photonic crystal is nearly a linear function of its crystalline thickness[15]. We therefore normalized the absolute reflection amplitude (after spectrum baseline correction) of a pressure-recovered SMP sample to that of the ethanol-activated control sample as an indicator of $R_r$ (FIG. 2.5B). A near-unity $R_r$ was obtained when a 54.4 kPa pressure was applied; while a ~50% recovery needed a pressure of 4.21 kPa. The cross-sectional SEM images in FIG. 2.5C,D, which correspond to the samples recovered by applying 7.13 and 27.9 kPa pressure, responsively, reveal that an intermediate pressure only induces the partial recovery of the top layers of the macroporous SMP photonic crystal, leading to the lower reflection amplitude compared with the fully recovered control sample.

Pressure-Induced SM Recovery Mechanisms.

Similar to thermoresponsive SMPs, we believe the entropy elasticity[1] is the energetic root cause for the SM effects exhibited by the new pressure-responsive SMPs. When photocured in the interstitial regions of the templating colloidal crystal, the cross-linked polymer chains were primarily in energetically favorable, stress-free configurations. The capillary pressure-induced "cold" programming squeezed the ordered macropores into disordered arrays with reduced thickness (see FIG. 2.3B,D), storing excess stresses in the deformed, temporarily configured polymer chains. The strained polymer networks have a strong tendency to recover back to their permanent, stress-free states. However, the observed pressure-induced macropore recovery is counterintuitive as we expect the applied pressure should further deform the collapsed macropores instead of popping them up. To elucidate this unusual shape recovery mechanism, we conducted in-situ nanoindentation tests to characterize the forces in the approaching and retracting processes when a spherical sapphire tip indented the macroporous SMP membrane (FIG. 2.6). An apparent adhesive pull-off force, caused by the attractive van der Waals interactions and the capillary force induced by the capillary-condensed water meniscus layer between the indenter tip and the SMP membrane[30], is evident in the retraction process. We believe this pull-off force causes the SM recovery of the collapsed macropores. A higher pressure leads to more conformal interactions between the molecules on the tip and the membrane and thus a larger pull-off force. This could explain the pressure effects on the strain recovery rate (FIG. 2.5B) and the partial recovery of the top-layer macropores when an intermediate pressure was applied (FIG. 2.5C). One strong evidence supporting this pull-off mechanism is that the collapsed macropores did not recover back to their ordered structure when a pressure (up to ~350 kPa) was applied through compressed air instead of a contacting body or entity (e.g., a finger or a rubber stamp), which could exert the pull-off force on the SMP macropores.

In conclusion, we have developed a new type of stimuli-responsive SMP that differs greatly from existing SMPs as it enables fast response and room-temperature operations for the entire SM cycle. The striking chromogenic effects induced by the recovery of the permanent 3-D photonic crystal structure provide opportunities for a wide spectrum of applications ranging from reconfigurable photonic crystal devices to chromogenic pressure and chemical sensors to novel biometric and anti-counterfeiting materials.

Methods

Templated Fabrication of Macroporous SMP Photonic Crystal Membranes.

Monodispersed silica microspheres, with diameter ranging from 100 to 600 nm, were synthesized by the standard Stöber method. Silica particles were purified in 200-proof ethanol by multiple centrifugation and redispersion cycles. Next, they were self-assembled on a glass microslide by the convective self-assembly technology to form colloidal crystals[15]. By adjusting the particle volume fraction of the silica/ethanol suspension, the thickness of the colloidal crystal was controlled to 10 to 50 colloidal monolayers. The microslide with the silica colloidal crystal on its surface was covered by another microslide and a double-sided adhesive tape of ~1 mm thick was used as a spacer in between the microslides. By utilizing capillary force, the interstitial air in-between the silica microspheres was replaced by viscous oligomer mixtures consisting of ethoxylated (20) trimethylolpropane triacrylate (SR415, Sartomer, MW 1176, viscosity 225 cps at 25° C., refractive index 1.470) and polyethylene glycol (600) diacrylate (SR610, Sartomer, MW 742, viscosity 90 cps at 25° C., refractive index 1.468) oligomers with varying volumetric ratios from 1:1 to 1:6. Darocur 1173 (2-hydroxy-2-methyl-1-phenyl-1-propanone, BASF, 1 wt %) was added as the photoinitiator. The sample was transferred to a pulsed UV curing system (RC 742, Xenon) and the oligomer mixture was rapidly polymerized by exposure to UV radiation for 4 s. The polymerized film was soaked in a 1 vol % hydrofluoric acid aqueous solution for 4 h and then rinsed with deionized water. The resulting self-standing macroporous polymer membrane showed pale iridescent colors when immersed in water and observed at large viewing angles (>45°) due to the small refractive index contrast between the copolymer (~1.47) and water (1.33).

Printing Arbitrary Photonic Crystal Patterns on Macroporous SMP Membranes.

Using Kimwipes, the free-standing macroporous SMP membrane was dried, and the diffractive colors of the film were lost during water evaporation. Strikingly iridescent photonic crystal patterns, whose colors are determined by the size of the templating silica microspheres, can be printed on the translucent SMP membranes by using various substances with relief patterns, such as fingers or rubber stamps (see FIG. 2.3C,E). To generate microscopic photonic crystal patterns, standard photolithography and chlorine reactive ion etching (RIE) were performed in a class 100 cleanroom to fabricate micropatterns (e.g., parallel lines in FIG. 2.3G) on a silicon wafer. The hard silicon mold was then placed on a SMP membrane and a typical fingerprinting pressure was applied on the mold to transfer the micropatterns. To evaluate the pressure effects on the macroporous SMP strain recovery rate, we placed different weights (43, 73, 85, 130, 162, 285, and 555 g) on a small PDMS square (1 cm×1 cm, Sylgard 184, cured at 75° C. for 2 h) to generate various pressures on a macroporous copolymer membrane.

Sample Characterization.

SEM imaging was carried out on a FEI XL-40 FEG-SEM. A thin layer of gold was sputtered onto the samples prior to imaging. Amplitude-modulation atomic force microscopy (AM-AFM) was performed using a MFP-3D AFM (Asylum Research, Inc.) with a Nanosensor PPP-NCHR probe (tip radius <10 nm) to characterize the topography and surface roughness of macroporous SMP membranes. In-situ nanoindentation tests were performed with a MFP-3D NanoIndenter (Asylum Research, Inc.) using a spherical sapphire indenter (tip radius ~125 µm). Such configuration of the instrument has a force and displacement resolution less than 3 µN and 1 nm, respectively. An Instron model 1122 load frame upgraded with an MTS ReNew system and equipped with a 500 g load cell at a crosshead speed of 0.5 mm/min was used in testing the tensile strength of the SMP membranes. Differential scanning calorimetric measurements were carried out from −80 to 18° C. at a heating rate of 10° C. min$^{-1}$ using a Seiko DSC 6200 instrument and an empty pan as reference. Normal-incidence optical reflection spectra were obtained using an Ocean Optics HR4000 high-resolution fiber optic vis-NIR spectrometer with a reflection probe (R-400-7-SR) and a tungsten halogen light source (LS-1). Absolute reflectivity was obtained as the ratio of the sample spectrum and a reference spectrum, which was the optical density obtained from an aluminum-sputtered (1000 nm thickness) silicon wafer.

Scalar Wave Approximation Optical Modeling.

The scalar wave theory developed for periodic dielectric structures[29] was implemented to calculate the normal-incidence optical reflection spectra from macroporous SMP photonic crystals. In this theory, Maxwell's equations are solved for a periodic dielectric assuming that one may neglect diffraction from all but one set of crystalline planes (e.g., the (111) planes in our case). The SWA calculation contains no adjustable parameters, since the size of the macropores and the crystal thickness were independently determined from SEM characterization, and the refractive index of the SMP copolymer is known.

REFERENCES FOR EXAMPLE 2

1. Lendlein, A. *Shape Memory Polymers*. (Springer, 2010).
2. Xie, T. Tunable polymer multi-shape memory effect. *Nature* 464, 267-270 (2010).
3. Xie, T. Recent advances in polymer shape memory. *Polymer* 52, 4985-5000 (2011).
4. Mather, P. T., Luo, X. & Rousseau, I. A. Shape memory polymer research. *Annu. Rev. Mater. Res.* 39, 445-471 (2009).
5. Huang, W. M., Yang, B., Zhao, Y. & Ding, Z. Thermomoisture responsive polyurethane shape-memory polymer and composites: a review. *J. Mater. Chem.* 20, 3367-3381 (2010).
6. Lendlein, A., Jiang, H. Y., Junger, O. & Langer, R. Light-induced shape-memory polymers. *Nature* 434, 879-882 (2005).
7. Yakacki, C. M. et al. Impact of shape-memory programming on mechanically-driven recovery in polymers. *Polymer* 52, 4947-4954 (2011).
8. Li, J. & Xie, T. Significant impact of thermo-mechanical conditions on polymer triple-shape memory effect. *Macromolecules* 44, 175-180 (2011).
9. Wang, Z. et al. Programmable, pattern-memorizing polymer surface. *Adv. Mater.* 23, 3669-3673 (2011).
10. Xu, H. et al. Deformable, programmable, and shape-memorizing micro-optics. *Adv. Funct. Mater.* 23, 3299-3306 (2013).
11. Jang, J.-H., Koh, C. Y., Bertoldi, K., Boyce, M. C. & Thomas, E. L. Combining pattern instability and shape-memory hysteresis for phononic switching. *Nano Lett.* 9, 2113-2119 (2009).
12. Espinha, A., Concepcion Serrano, M., Blanco, A. & Lopez, C. Thermoresponsive shape-memory photonic nanostructures. *Adv. Opt. Mater.* 2, 516-521 (2014).
13. Schaefer, C. G. et al. Reversible light-, thermo-, and mechano-responsive elastomeric polymer opal films. *Chem. Mater.* 25, 2309-2318 (2013).
14. Shah, A. A., Schultz, B., Zhang, W. J., Glotzer, S. C. & Solomon, M. J. Actuation of shape-memory colloidal fibres of Janus ellipsoids. *Nat. Mater.* 14, 117-124 (2015).
15. Bertone, J. F., Jiang, P., Hwang, K. S., Mittleman, D. M. & Colvin, V. L. Thickness dependence of the optical properties of ordered silica-air and air-polymer photonic crystals. *Phys. Rev. Lett.* 83, 300-303 (1999).
16. Velev, O. D., Jede, T. A., Lobo, R. F. & Lenhoff, A. M. Porous silica via colloidal crystallization. *Nature* 389, 447-448 (1997).
17. Joannopoulos, J. D., Meade, R. D. & Winn, J. N. *Photonic Crystals: Molding the Flow of Light*. (Princeton University Press, 1995).
18. Arsenault, A. C. et al. From colour fingerprinting to the control of photoluminescence in elastic photonic crystals. *Nat. Mater.* 5, 179-184 (2006).
19. Rinne, S. A., Garcia-Santamaria, F. & Braun, P. V. Embedded cavities and waveguides in three-dimensional silicon photonic crystals. *Nat. Photon.* 2, 52-56 (2008).
20. Ge, J., Hu, Y. & Yin, Y. Highly tunable superparamagnetic colloidal photonic crystals. *Angew. Chem. Int. Ed.* 46, 7428-7431 (2007).
21. Yang, D., Ye, S. & Ge, J. From metastable colloidal crystalline arrays to fast responsive mechanochromic photonic gels: An organic gel for deformation-based display panels. *Adv. Funct. Mater.* 24, 3197-3205 (2014).
22. Burgess, I. B., Loncar, M. & Aizenberg, J. Structural colour in colourimetric sensors and indicators. *J Mater. Chem. C* 1, 6075-6086 (2013).
23. Kang, Y., Walish, J. J., Gorishnyy, T. & Thomas, E. L. Broad-wavelength-range chemically tunable block-copolymer photonic gels. *Nat. Mater.* 6, 957-960 (2007).
24. Deotare, P. B. et al. All optical reconfiguration of optomechanical filters. *Nat. Commun.* 3 (2012).
25. Wang, W. S., Xie, N., He, L. & Yin, Y. D. Photocatalytic colour switching of redox dyes for ink-free light-printable rewritable paper. *Nature Commun.* 5, 5459 (2014).
26. Grillet, C. et al. Reconfigurable photonic crystal circuits. *Laser Photon. Rev.* 4, 192-204 (2010).
27. Gregg, S. J. & Sing, K. S. W. *Adsorption, Surface Area and Porosity*. 2nd edn, (Academic Press Inc., 1982).

28. Tsai, J. T. et al. Retainment of pore connectivity in membranes prepared with vapor-induced phase separation. *J. Membr. Sci.* 362, 360-373 (2010).
29. Satpathy, S., Zhang, Z. & Salehpour, M. R. Theory of photon bands in 3-dimensional periodic dielectric structures. *Phys. Rev. Lett.* 64, 1239-1242 (1990).
30. Butt, H. J., Cappella, B. & Kappl, M. Force measurements with the atomic force microscope: Technique, interpretation and applications. *Surf. Sci. Rep.* 59, 1-152 (2005).

Example 3

In this example we report a single-step direct writing technology for making three-dimensional (3D) macroporous photonic crystal patterns on a new type of pressure-responsive shape memory polymer (SMP). This approach integrates two disparate fields that do not typically intersect—the well-established templating nanofabrication and shape memory materials. Periodic arrays of polymer macropores templated from self-assembled colloidal crystals are squeezed into disordered arrays in an unusual shape memory "cold" programming process. The recovery of the original macroporous photonic crystal lattices can be triggered by direct writing at ambient conditions using both macroscopic and nanoscopic tools, like a pencil or a nanoindenter. Interestingly, this shape memory disorder-order transition is reversible and the photonic crystal patterns can be erased and regenerated for hundreds of times, promising for making reconfigurable/rewritable nanooptical devices. Quantitative insights into the shape memory recovery of collapsed macropores induced by the lateral shear stresses in direct writing are gained through fundamental investigations on important process parameters, including the tip material, the critical pressure and writing speed for triggering the recovery of the deformed macropores, and the minimal feature size that can be directly written on the SMP membranes. Besides straightforward applications in photonic crystal devices, these smart mechanochromic SMPs that are sensitive to various mechanical stresses could render important technological applications ranging from chromogenic stress and impact sensors to rewritable high-density optical data storage media.

Three-dimensional printing (or additive manufacturing) has attracted great recent interest as it enables rapid manufacturing and prototyping of 3D objects with arbitrary shapes and/or geometries.[1-4] In 3D printing, successive layers of materials (e.g., polymers, ceramics, and metal alloys) are laid down under computer control through processes like inkjet printing, extrusion, and sintering. Beyond conventional manufacture of macroscopic objects (e.g., customized shoes, automobile parts, and even guns), 3D printing has also been extensively exploited for fabricating microscopic devices with unique optical, electrical, magnetic, and biological properties.[5-7] One preeminent example is the direct writing of 3D ordered photonic crystals with desired crystal structures and pre-engineered defects.[8-14] Photonic crystals are periodic dielectric structures with a forbidden photonic band gap (PBG) for electromagnetic waves.[15] As 3D photonic crystals with full PBGs can manipulate photons in a similar fashion as semiconductors do electrons, they provide enormous opportunities in controlling the flow of light in microscopic volumes for a plethora of applications ranging from all-optical integrated circuits and quantum information processing to low-threshold lasers and lossless waveguides.[15-16] To fabricate photonic crystals possessing optical and near-infrared (NIR) PBGs, the lattice constant of the artificial crystal must have dimensions on the submicrometer scale.[15,17] Unfortunately, this length scale is formidably challenging for direct-writing-based 3D printing technologies, especially considering the overflow of the ink materials (e.g., photopolymers) in the layer-by-layer deposition process.[4]

Here we report a single-step direct writing technology for reversibly printing 3D macroporous photonic crystal patterns (both macroscopic and nanoscopic) with submicrometer-scale lattice spacing on a new type of pressure-responsive shape memory polymer. This technology integrates scientific principles drawn from two disparate fields—the well-established templating nanofabrication[18-20] and shape memory materials.[21-23] Compared with conventional 3D printing, which needs to address the resolution issue in generating the intrinsic 3D submicrometer-scale microstructures, the current approach utilizes colloidal crystal-based templating nanofabrication in defining the final photonic crystal lattice parameters.[24-25] Self-assembled colloidal crystals have been widely used as structural templates in fabricating macroporous photonic crystals with periodic arrays of air cavities embedded in the matrix material (e.g., polymer, metal, and semiconductor).[19,25-29] The stringent submicrometer-scale lattice spacing requirement for making visible- and NIR-active 3D photonic crystals can be easily satisfied by controlling the size of the templating colloidal particles.[28] Another major merit of the current technology is the employment of new pressure-sensitive SMPs that enable the direct writing of arbitrary 3D macroporous photonic crystal patterns on the polymer surface in a single step.[30-31] Shape memory polymers are a class of smart materials that can recover their "memorized" permanent shapes triggered by various external stimuli, such as heat, light, solvent, and electromagnetic field.[22-23,32-41] Shape memory (SM) effects in traditional SMPs are usually achieved in three steps—programming, storage, and recovery.[33] In programming, a SMP sample is mechanically deformed from its permanent shape to a temporary configuration by heating the sample above a specific transition temperature ($T_{trans}$), such as the polymer glass transition temperature ($T_g$). The temporary shape is then "frozen" in the polymer by cooling the deformed sample below $T_{trans}$. Recovery to the permanent shape, which is caused by entropy elasticity,[33] can finally be triggered by applying different stimuli, such as reheating the sample above $T_{trans}$ or exposing it to ultraviolet radiation. Although thermoresponsive SMPs have been utilized in making tunable 3D colloidal photonic crystals and 2D diffractive gratings,[42-49] the heat-demanding SM programming and recovery steps impede the ultimate performance and applications of the SMP-enabled microoptical devices.

Experimental Section

Templating Nanofabrication of Macroporous SMP Photonic Crystal Membranes.

Monodispersed silica microspheres with diameter ranging from 200 to 400 nm were synthesized using the standard Stöber method.[50] The as-synthesized silica microspheres were purified in 200-proof ethanol by using multiple centrifugation and re-dispersion cycles (at least 5 times). The purified silica particles were then self-assembled on glass microslides to form hexagonally close-packed colloidal single crystals using the well-established convective self-assembly technology.[51] The thickness of the resulting colloidal crystal was controlled to ~5 μm by adjusting the particle volume fraction of the silica microsphere-ethanol suspension to ~1.0%. A double-sided adhesive tape (~1 mm thick) was used as a spacer to separate the glass microslide with the self-assembled silica colloidal crystal on its surface from another bare glass microslide. A viscous oligomer mixture containing 1.5 g polyethylene glycol (600) diacrylate (SR610, Sartomer, $T_g \sim -42°$ C., MW 742, refractive index 1.468), 0.5 g ethoxylated (20) trimethylolpropane triacrylate (SR415, Sartomer, $T_g \sim -40°$ C., MW 1176, refractive index 1.470), and 0.016 g Darocur 1173 photoinitiator (2-hydroxy-2-methyl-1-phenyl-1-propanone, BASF) was injected in between the two glass microslides to fill up the gap. The sample became nearly transparent due to the refractive index matching between the oligomer mixture and the silica microspheres. The oligomers were then photopolymerized by exposing the sample to ultraviolet radiation for 4 s using a pulsed UV curing system (RC 742, Xenon). The solidified sample was finally soaked in a 1 vol % hydrofluoric acid aqueous solution for 4 h and then rinsed with deionized water. After blow-drying with compressed air, free-standing macroporous SMP membranes were resulted.

Directly Printing and Hand-Writing 3D Macroscopic Photonic Crystal Patterns on Templated Macroporous SMP Membranes.

We prepared 2×2 cm² macroporous SMP membranes as "writing pads" for directly printing and hand-writing 3D photonic crystal patterns on them. Commercial rubber stamps with relief patterns purchased from Office Depot were pressed gently for 2 s on the SMP "writing pads" to print colorful inverted patterns on the macroporous membranes. To directly write 3D photonic crystal features, a home-made writing tool was made by wrapping a pencil with Handi-wrap plastic film. An iridescent "UF" pattern with vivid colors was then directly written on the SMP "writing pad". The colorful patterns can be erased by immersing the SMP membranes in deionized water and then drying out of water. Through thorough investigation, our results showed that the SMP "writing pads" can be reused hundreds of times without apparent degradation in rewritability.

Directly Writing 3D Photonic Crystal Micropatterns by Atomic Force Microscope (AFM).

A MFP-3D atomic force microscope (Asylum Research, CA) was used for writing microscopic patterns on SMP membranes. Both the dedicated MFP-3D NanoIndenter module (flexure, k=3814 N/m) and the AFM cantilever-based configuration were used with a 1 mm (sapphire, E=350 GPa) and a 20 µm (borosilicate, E=62.8 GPa, nominal k~42 N/m, length=125 µm, CP-NCH-BSG cantilever from sQUBE Inc., Bickenbach, Germany) diameter spherical tip, respectively. The minimum force and the displacement resolution of the NanoIndenter module is less than 3 µN and 1 nm, respectively. The resolutions of the cantilever-based configuration are less than 6 nN and 0.1 nm. The writing forces for both configurations were controlled by closed-loop control of the set-point voltage, which defines the amount of the contact force maintained during writing. The MicroAngelo™ software routine (Asylum Research) was used to program writing parameters including setpoint voltage, speed, feature geometry, etc.

Sample Characterization.

SEM imaging was carried out on a FEI Nova NanoSEM 430. A thin layer of gold was sputtered onto the samples prior to imaging. Amplitude-modulation atomic force microscopy (AM-AFM) was performed using the MFP-3D AFM with a Nanosensor PPP-NCHR probe (tip radius <10 nm). All AFM images were processed using the Scanning Probe Imaging Processor (SPIP, Image Metrology Inc., Horsholm, Denmark) software. Normal-incidence optical reflection spectra were obtained using an Ocean Optics HR4000 high-resolution fiber optic vis-NIR spectrometer with a reflection probe (R600-7) and a tungsten halogen light source (LS-1). Absolute reflectivity was obtained as the ratio of the sample spectrum and a reference spectrum, which was the optical density obtained from an aluminum-sputtered (1000 nm thickness) silicon wafer.

Scalar Wave Approximation (SWA) Optical Modeling.

The scalar wave theory developed for periodic dielectric structures was implemented to model the normal-incidence optical reflection spectra from macroporous SMP photonic crystal membranes.[52] In the SWA theory, Maxwell's equations are solved for a periodic dielectric medium assuming that one may neglect diffraction from all but one set of crystalline planes. In the current work, only the (111) crystalline planes of a face-centered cubic crystal were considered in the modeling. The SWA simulation contained no adjustable parameters, as the size of the macropores and the crystal thickness were experimentally determined from SEM images, and the refractive indices of the SMP copolymers were known.

Results and Discussion

Concept of Direct Writing of 3D Photonic Crystals on Macroporous SMP Membranes.

We have recently discovered a new type of stimuli-responsive shape memory polymer that enables unusual "cold" programming (i.e., the deformation from the permanent shape to the temporary configuration occurs at room temperature) and instantaneous shape recovery at ambient conditions triggered by applying a static contact pressure or exposing the polymer to various organic vapors (e.g., acetone and toluene).[30-31] These new SMPs are composed of photocured copolymers of ethoxylated (20) trimethylolpropane triacrylate (ETPTA 20) and polyethylene glycol (600) diacrylate (PEGDA 600) oligomers with varying volumetric ratios from 1:1 to 1:6. FIGS. 3.1A-D show an exemplary pressure-induced SM recovery process using an ETPTA 20-co-PEGDA 600 copolymer with a 1:3 volumetric ratio. The relief "⁺A" pattern on the surface of a commercial rubber stamp (FIG. 3.1A) was inversely printed on a translucent SMP membrane with collapsed macropores (temporary configuration, FIG. 3.1C). The SM recovery of the permanent, 3D ordered macroporous arrays (FIG. 3.1D), which were templated from self-assembled colloidal crystals consisting of 280 nm silica microspheres, led to the iridescent structural colors of the printed "A⁺" pattern in FIG. 3.1B. To explain this counterintuitive pressure-induced recovery of collapsed macropores, we proposed a SM recovery mechanism triggered by an adhesive pull-off force caused by the attractive van der Waals interactions between the rubber stamp and the pressure-responsive SMP membrane.[30] However, this new recovery mechanism is far from being thoroughly investigated and verified. Here we explore a new direct writing technology for inscribing arbitrary 3D photonic crystal patterns on the above pressure-responsive SMP membranes. In sharp contrast to the vertical pull-off force in our previous static printing process, the lateral shear stress plays a critical role in this dynamic approach.

The scheme in FIG. 3.2 illustrates the basic concept of the new direct writing technology for making 3D ordered photonic crystal patterns on a macroporous SMP membrane with collapsed macropores. The self-standing SMP membranes were produced by templating nanofabrication using convectively self-assembled silica colloidal crystals as structural template.[53] In this process, ETPTA 20 and PEGDA 600 oligomer mixtures were first photopolymerized in the interstitials of 3D ordered silica particle arrays. The cross-linked polymer chains in the 3D inversely ordered polymer matrix were primarily in an energetically favorable, stress-free configuration, denoting the permanent state of the SMPs. After removing the templating silica microspheres in a hydrofluoric acid aqueous solution and drying the SMP membrane out of water, the originally ordered macropores were surprisingly collapsed, resulting in the translucent appearance of the film (see FIG. 3.1B). Our previous studies showed that strong capillary pressure induced by water evaporation deformed the elastic macropores ($T_g$ of the copolymers<<room temperature) into disordered arrays in this "cold" programming process (i.e., the deformation of ordered macropores occurred at ambient conditions as compared to traditional "hot" programming steps),[30] storing excess stresses in the squeezed, temporarily configured polymer chains. The recovery of the permanent, stress-free state (i.e., 3D ordered macroporous arrays) can be triggered by direct writing using either macroscopic or microscopic writing tools like a conventional pen or an atomic force microscope tip. As the SM recovery is confined only to the regions underneath the writing tool and the recovered feature size is mainly determined by the sharpness of the writing tip, we can generate nanoscopic photonic crystal patterns, like the letters "U" and "F" in FIG. 3.2 (representing the abbreviations for University of Florida), using a sharp AFM tip. In addition to induce the above disorder-to-order transition, the direct writing process can also pop up the deformed macropores underneath the tip, making the recovered photonic crystal patterns protruding out of an otherwise disordered background.

Direct Writing of Macroscopic Photonic Crystal Patterns.

We started to demonstrate the direct writing of 3D photonic crystal patterns on pressure-responsive SMP membranes using macroscopic writing tools like a conventional fountain pen (without ink). However, the direct writing-induced SM recovery of collapsed macropores was not as straightforward as that exhibited by static printing.[30] Although well-defined writing marks were left underneath the stainless steel tip of the fountain pen, these marks were pale-colored, indicating an incomplete macropore recovery process. Our extensive experiments revealed that the tip material plays a determining role in triggering SM macropore recovery. Hard materials, like metals, graphite (pencil cores), and hard plastics (e.g., polystyrene), were found inefficient in generating colorful patterns; while soft materials, such as low density polyethylene (LDPE) and polydimethylsiloxane (PDMS) with different elastic moduli (synthesized by controlling the mixing ratio of the two precursors of Sylgard 184 PDMS), were much easier in inducing a complete macropore recovery. We speculate that soft materials could induce stronger van der Waals interactions between the writing tip and the SMP membrane than harder tips, and thus lead to larger pull-off force for popping up the deformed macropores. Direct writing process using a LDPE-wrapped pencil as the writing tool has been achieved. Iridescent features with the same dimension as the writing tip immediately showed up following the movement of the tip. FIG. 3.3A displays a greenish "UF" pattern written on a translucent macroporous SMP copolymer membrane templated from 300 nm silica microspheres. The typical cross-sectional scanning electron microscope (SEM) image in FIG. 3b reveals that the macropores in the non-iridescent regions in FIG. 3.3A are disordered and the surface of the deformed membrane is quite rough. By contrast, the macropores in the recovered iridescent regions are 3D highly ordered and the film surface is much smoother (FIG. 3.3C). The average thickness of the macroporous layer changes from 2.77±0.26 µm for the disordered array to 4.56±0.04 µm for the recovered photonic crystal, indicating a 65% expansion of the deformed macropores. Importantly, the directly written photonic crystal patterns stored at ambient conditions are stable for a long period of time. The batches of samples prepared 8 months ago still maintain their vivid iridescent colors and well-defined patterns. No spontaneous recovery of the deformed macropores was observed at ambient conditions.

The different optical appearances of the translucent and the iridescent regions in FIG. 3a can be quantitatively characterized by comparing their normal-incidence optical reflection spectra (FIG. 3.3D). No apparent Bragg diffraction peaks are shown in the spectrum corresponding to the translucent region; while a distinct optical stop band located at ~543 nm with well-defined Fabry-Perot fringes is present in the spectrum obtained from the iridescent region. Importantly, the experimental spectrum matches well with the simulated spectrum using a scalar-wave approximation model which assumes a perfect face-centered cubic (F.C.C.) crystalline lattice with its (111) planes normal to the incident light.[52] This good match demonstrates the high crystalline quality of the writing-recovered photonic crystals. Moreover, the direct writing process is reversible. The pre-written photonic crystal patterns can be entirely erased by drying the SMP membrane out of water. New photonic crystal features can then be written on the regenerated translucent film. This rewriting process can be repeatedly done without apparent degradation in the chromogenic response of the SMP membranes. Normal-incidence optical reflection spectra obtained from a macroporous SMP membrane under 9 cycles of writing and erasing processes has been obtained. The comparison of the absolute reflection amplitudes of the diffraction peaks and the amplitudes taken at 550 nm wavelength confirms the good reversibility of the reconfiguration processes.

Direct Writing of Nanoscopic Photonic Crystal Patterns.

In addition to macroscopic writing tools, atomic force microscopy was used to explore the capability in directly writing micro-/nano-scale photonic crystal features under well-controlled conditions. FIGS. 3.4A and 3.4B shows AFM images of the designed "U" and "F" micropatterns written on a SMP copolymer membrane with 300 nm macropores using a 1 mm diameter sapphire spherical tip. Both letters were written with 140 µN contact force at a lateral writing speed of 5 µm/s. Each letter was written within a 100×100 µm² region. As illustrated by the corresponding depth profiles in FIGS. 3.4C and 3.4D, the letters protrude out from the rough membrane surface to a height of ~2 µm, and the minimum line width achieved by using the blunt tip is approximately 30 µm. The raised letters indicate that the SMP surface underwent a vertical transformation during the direct writing process, agreeing with the apparent thickness increase of the macroporous layer (~1.8 µm) revealed by SEM (see FIGS. 3.3B and 3.3C). Optical microscopy images (not shown here) illustrate that only the micropatterned areas reflect brilliant green light. A further observation of the SMP surface topography by higher resolution AFM imaging (FIG. 3.5A-D) show not only that the patterned areas are much smoother than the unpatterned areas (FIGS. 3.5C and 3.5D), but also, the ordered arrangement of the macropores only appears on the patterned areas (FIGS. 3.5A and 3.5B). The root-mean-square (RMS) linear profile roughness ($R_q$) of the patterned and unpatterned regions is 5.53±0.75 µm and 50.51±8.93 µm, respectively. The combination of the above observations including the ordered surface macropore structure supports that the reflective "UF" micropatterns are periodic arrays of recovered macropores.

Critical Contact Pressure Inducing SM Recovery.

To determine the critical contact pressure that can trigger the recovery of the deformed macropores during direct writing, a series of microscopic lines were written with decreasing force by controlling the set-point voltage applied to the AFM flexure. FIG. 3.6A shows an optical microscope image (in transmission mode) of 6 lines written with 13.8, 27.7, 138, 277, 830, and 1380 µN force (from left to right, corresponding to 0.005, 0.01, 0.05, 0.1, 0.3, and 0.5 V set-point voltage). The tip writing speed was held constant at 1 µm/s. In addition to the apparent difference in line width as revealed by the optical microscope image, other characteristics of the written lines were identified by AFM images (FIG. 3.6B-3.6G) and the corresponding depth profiles (FIG. 3.6H-3.6M). The line widths determined by both AFM and optical microscope images decrease from ~60 µm for the maximum force (1380 µN) to ~25 µm for the minimal force (13.8 µN); while the heights of the protruding lines are nearly constant at ~1.2 µm. This means the SMP can recover to its permanent shape due to the tip-sample interaction, which is in part caused by the attractive force (adhesion) between the tip and the copolymer membrane.[30] This attractive force is contributed by both the van der Waals interactions and the capillary force generated by the water meniscus bridging in between the tip and sample.[54] The average maximum attractive force ($F_{attr}^{ave}$) can be determined from the measurement of the pull-off force required to disengage the contact of the AFM tip with the sample. The contact force was calculated as the difference between the $F_{attr}^{ave}$ and the pulling force applied by the tip. The minimum pressure that can induce the SM recovery was determined by $P_m = F_m/A$, where $P_m$ is the minimum pressure, $F_m$ is the minimum contact force and $A=\pi r^2$ is the contact area. The minimum contact radius r is calculated as half of the line width. Table 1 summarizes the writing forces, the resulting line widths, and the calculated contact pressures. The minimum contact pressure that can cause the macropore recovery was determined to be ~26 kPa. Quasi-static indentation was also explored to compare with the dynamic direct writing process. However, even with an applied force 1000 times larger than the writing one, the SMP surface was barely recovered by quasi-static indentation, as there was no distinguishable diffractive photonic crystal pattern generated. The SM recovery mechanisms and the difference between these two processes will be discussed in section 3.6.

Writing Speed Effects on SM Recovery.

To further investigate the writing speed effects on the SMP surface recovery, as well as the minimal line width enabled by AFM directly writing, a 20 µm diameter borosilicate spherical tip was used to perform a series of writing experiments. By using a smaller tip radius, the resolution is significantly increased along with the sensitivity in writing speed. The AFM images in FIG. 3.7A-D show nanoscopic lines written with the same force (6 µN), but the writing speed was increased from 0.2 µm/s (FIG. 3.7A) to 20 µm/s (FIG. 3.7D). The characteristics of the resulting nanopatterns including line widths and protruding heights are summarized in Table 2. It is apparent that both the line widths and heights of the recovered nanopatterns increased with higher writing speed. This set of experiments confirms that the SM recovery of the deformed macropores is dependent on the lateral motion and perturbation between the AFM tip and the SMP membrane.

SM Recovery Mechanisms.

All above experimental results have indicated that the direct writing approach is not a simple and straightforward extension of the static printing technology as reported in our previous work.[30] From an energy perspective, the SM deformation and recovery processes are due to the energy transformation between the external (i.e., capillary pressure induced by water evaporation, applied contact force, and shear stress caused by tip lateral motion) and the internal (e.g., polymer chain movement, internal energy change, and stored elastic energy) of the SMP system. At room temperature, the ETPTA 20-co-PEGDA 600 copolymer is in its rubbery state, above the glass transition temperature ($T_g$~−42° C.).[30] The polymer chains are highly compliant at room temperature and the polymer behaves like a soft (viscous) elastic material.[55] The large capillary pressure induced by the high surface tension of water collapses the originally ordered macropores during the water evaporation process.[30] To reactivate the squeezed polymer chains and trigger the collapsed macropore recovery to its original configuration, external input energy is needed, or, equivalently, a reverse process to water evaporation is needed. Mechanical stress—in the form of either statically or dynamically applied force by a rubber stamp or a writing tip can input energy into the SMP system.[56] In the case of direct writing, the energy required to overcome the SM activation barrier is provided by sliding the tip across the SMP surface with a compressive force. The kinetic energy of the tip is transferred to the polymer matrix in the form of shear deformation and vibration.[56-58] The combination of shear and vibration, which increases the internal energy of the SMP system, provides the energy to activate polymer chain mobility and trigger the macropore recovery. Our experimental results show that with higher tip sliding speed, a more complete recovery of SMP was achieved, which was presented as a higher recovered line width and height (see FIG. 3.7A-D). This is in accordance with intuition that the more input energy, the higher density of activated polymer chains.

It has been argued that the shear stress field can induce changes in the conformation of intermolecular bonds and polymer chain flow in glassy polymers at temperatures above $T_g$.[59] In addition, a recent study was able to directly measure stress-induced molecular mobility in glassy polymers.[60] Mobility was shown to increase by 10-1000 folds after stress was applied. Furthermore, nanoscopically raised patterns were observed when a polyethyleneoxide (PEO) film was raster-scanned by an AFM tip at ambient conditions.[58] Viscoelastic effects and localized heating caused by rupture of the adhesive bonds between the tip and the polymer, which could raise the local surface temperature by up to several hundred kelvin, were attributed to the unexpected formation of the raised areas during scanning. These studies support what we observed with the effects of the tip materials (e.g., LDPE vs. stainless stain tip) and the varying writing speed (i.e., strain rate) on the SM macropore recovery. LDPE-wrapped tips, which could induce stronger van der Waals interactions with the ETPTA 20-co-PEGDA 600 copolymers than stainless steel tips, are thus more efficient in inducing a more complete SM recovery during direct writing. In the case of quasi-static indentation, only vertical contact between the tip and the SMP membrane was involved. During indentation, the AFM tip compressed the macroporous structure to a more squeezed configuration. The majority of the external energy was stored in the elastic deformation of the polymer matrix. Only very limited kinetic energy was transferred as internal energy to activate the polymer chains. As a result, a comparatively larger force is expected to reactivate the polymer chain mobility than in the dynamic writing case. In retraction, the stored elastic potential energy was gradually released as the SMP surface returned to its initial contact height. Then the attractive adhesion force between the tip and the sample acted as the subsequent recovery force.[30] Our experimental results support this conjecture. It is worthy to point out that the minimum force that can cause macropore recovery in quasi-static indentation is two to three orders magnitude higher than that in dynamic writing. Assuming the indention process is one extreme case in writing for which the lateral speed is zero, then, it is clear that the dominant energy to induce SM recovery comes from the lateral movement of the writing tip.

CONCLUSIONS

In conclusion, by integrating the well-established templating nanofabrication with a new type of pressure-responsive SMP, we have developed a dynamic direct writing technology for fabricating 3D ordered macroporous photonic crystal patterns in a single step. We have demonstrated that both macroscopic and nanoscopic photonic crystal features can be reversibly patterned and erased, highly desirable for developing reconfigurable nanooptical devices. Systematic experiments have revealed the importance of the material selection, dimension, applied force, and writing speed of the tips in affecting the SM recovery of 3D ordered macropores. Importantly, the dynamic writing approach exhibits significant differences in SM recovery mechanisms and critical recovery force than quasi-static indentation. Besides straightforward applications in photonic crystal devices and nanooptics, the striking chromogenic effects induced by the disorder-to-order transition during SM recovery of ordered macropores, the manifest protrusion of the recovered regions, the sensitivity of the SMP membranes to various mechanical stresses, the unusual room-temperature operation for the entire shape-memory cycle (from programming to recovery), and the microscopic resolution of the directly written features could add new dimensions to many existing and future applications, such as in mechanochromic stress and impact sensors,[61-65] rewritable high-density optical data storage media,[66-67] chromogenic chemical sensors,[68-69] and tunable phononic crystals for controlling the flow of phonons.[49,70]

TABLE 1

Dependence of the recovered line widths on the parameters of the AFM-based direct writing process.

| | Set Point Voltage (V) | | | | | |
| --- | --- | --- | --- | --- | --- | --- |
| | 0.005 | 0.01 | 0.05 | 0.1 | 0.3 | 0.5 |
| Writing Force (μN) | 13.8 | 27.7 | 138 | 277 | 830 | 1380 |
| Line Width (μm) | 25.8 ± 1.9 | 33.0 ± 2.7 | 40.4 ± 1.1 | 44.3 ± 1.6 | 53.8 ± 2.2 | 60.4 ± 1.1 |
| Contact Pressure (kPa) | 26.2 | 32.0 | 106.7 | 177.4 | 361.1 | 477.4 |

TABLE 2

Dependence of the recovered line width and height on the writing speed of the AFM tip.

| Writing Speed (μm/s) | 0.2 | 1 | 5 | 20 |
| --- | --- | --- | --- | --- |
| Line Width (μm) | 4.1 ± 0.4 | 5.6 ± 0.9 | 6.0 ± 0.9 | 6.4 ± 0.4 |
| Line Height (nm) | 301 ± 12 | 407 ± 17 | 477 ± 20 | 526 ± 29 |

REFERENCES, EXAMPLE 3

1. Tumbleston, J. R.; Shirvanyants, D.; Ermoshkin, N.; Janusziewicz, R.; Johnson, A. R.; Kelly, D.; Chen, K.; Pinschmidt, R.; Rolland, J. P.; Ermoshkin, A.; Samulski, E. T.; DeSimone, J. M., Continuous Liquid Interface Production of 3d Objects. Science 2015, 347, 1349-1352.
2. Li, J.; He, L.; Zhou, C.; Zhou, Y.; Bai, Y.; Lee, F. Y.; Mao, J. J., 3d Printing for Regenerative Medicine: From Bench to Bedside. MRS Bull. 2015, 40, 145-153.
3. Gross, B. C.; Erkal, J. L.; Lockwood, S. Y.; Chen, C.; Spence, D. M., Evaluation of 3d Printing and Its Potential Impact on Biotechnology and the Chemical Sciences. Anal. Chem. 2014, 86, 3240-3253.
4. Lewis, J. A., Direct Ink Writing of 3d Functional Materials. Adv. Funct. Mater. 2006, 16, 2193-2204.
5. Sun, K.; Wei, T.-S.; Ahn, B. Y.; Seo, J. Y.; Dillon, S. J.; Lewis, J. A., 3d Printing of Interdigitated Li-Ion Microbattery Architectures. Adv. Mater. 2013, 25, 4539-4543.
6. Lessing, J.; Glavan, A. C.; Walker, S. B.; Keplinger, C.; Lewis, J. A.; Whitesides, G. M., Inkjet Printing of Conductive Inks with High Lateral Resolution on Omniphobic "R-F Paper" for Paper-Based Electronics and MEMS. Adv. Mater. 2014, 26, 4677-4682.
7. Murphy, S. V.; Atala, A., 3d Bioprinting of Tissues and Organs. Nat. Biotech. 2014, 32, 773-785.
8. Rinne, S. A.; Garcia-Santamaria, F.; Braun, P. V., Embedded Cavities and Waveguides in Three-Dimensional Silicon Photonic Crystals. Nat. Photonics 2008, 2, 52-56.
9. Gratson, G. M.; Garcia-Santamaria, F.; Lousse, V.; Xu, M. J.; Fan, S. H.; Lewis, J. A.; Braun, P. V., Direct-Write Assembly of Three-Dimensional Photonic Crystals: Conversion of Polymer Scaffolds to Silicon Hollow-Woodpile Structures. Adv. Mater. 2006, 18, 461-465.
10. Shen, W.; Li, M.; Ye, C.; Jiang, L.; Song, Y., Direct-Writing Colloidal Photonic Crystal Microfluidic Chips by Inkjet Printing for Label-Free Protein Detection. Lab Chip 2012, 12, 3089-3095.
11. Froelich, A.; Fischer, J.; Zebrowski, T.; Busch, K.; Wegener, M., Titania Woodpiles with Complete Three-Dimensional Photonic Bandgaps in the Visible. Adv. Mater. 2013, 25, 3588-3592.
12. Thiel, M.; Fischer, J.; von Freymann, G.; Wegener, M., Direct Laser Writing of Three-Dimensional Submicron Structures Using a Continuous-Wave Laser at 532 Nm. Appl. Phys. Lett. 2010, 97, 221102.
13. Lenhert, S.; Brinkmann, F.; Laue, T.; Walheim, S.; Vannahme, C.; Klinkhammer, S.; Xu, M.; Sekula, S.; Mappes, T.; Schimmel, T.; Fuchs, H., Lipid Multilayer Gratings. Nat. Nanotech. 2010, 5, 275-279.
14. Lee, W. M.; Pruzinsky, S. A.; Braun, P. V., Multi-Photon Polymerization of Waveguide Structures within Three-Dimensional Photonic Crystals. Adv. Mater. 2002, 14, 271-274.
15. Joannopoulos, J. D.; Meade, R. D.; Winn, J. N., Photonic Crystals: Molding the Flow of Light. Princeton University Press: Princeton, 1995.
16. Grillet, C.; Monat, C.; Smith, C. L.; Lee, M. W.; Tomljenovic-Hanic, S.; Karnutsch, C.; Eggleton, B. J., Reconfigurable Photonic Crystal Circuits. Laser Photon. Rev. 2010, 4, 192-204.
17. Ge, J. P.; Yin, Y. D., Magnetically Responsive Colloidal Photonic Crystals. J. Mater. Chem. 2008, 18, 5041-5045.
18. Zhang, J.; Li, Y.; Zhang, X.; Yang, B., Colloidal Self-Assembly Meets Nanofabrication: From Two-Dimensional Colloidal Crystals to Nanostructure Arrays. Adv. Mater. 2010, 22, 4249-4269.

19. Velev, O. D.; Jede, T. A.; Lobo, R. F.; Lenhoff, A. M., Porous Silica Via Colloidal Crystallization. *Nature* 1997, 389, 447-448.
20. Hatton, B.; Mishchenko, L.; Davis, S.; Sandhage, K. H.; Aizenberg, J., Assembly of Large-Area, Highly Ordered, Crack-Free Inverse Opal Films. *Proc. Natl. Acad. Sci. USA* 2010, 107, 10354-10359.
21. Lendlein, A., *Shape Memory Polymers*. Springer: New York, N.Y., 2010.
22. Mather, P. T.; Luo, X.; Rousseau, I. A., Shape Memory Polymer Research. *Annu. Rev. Mater. Res.* 2009, 39, 445-471.
23. Xie, T.; Xiao, X.; Li, J.; Wang, R., Encoding Localized Strain History through Wrinkle Based Structural Colors. *Adv. Mater.* 2010, 22, 4390-4394.
24. Arsenault, A. C.; Puzzo, D. P.; Manners, I.; Ozin, G. A., Photonic-Crystal Full-Colour Displays. *Nat. Photonics* 2007, 1, 468-472.
25. Vlasov, Y. A.; Bo, X. Z.; Sturm, J. C.; Norris, D. J., On-Chip Natural Assembly of Silicon Photonic Bandgap Crystals. *Nature* 2001, 414, 289-293.
26. Wijnhoven, J.; Vos, W. L., Preparation of Photonic Crystals Made of Air Spheres in Titania. *Science* 1998, 281, 802-804.
27. Kuncicky, D. M.; Prevo, B. G.; Velev, O. D., Controlled Assembly of Sers Substrates Templated by Colloidal Crystal Films. I *Mater. Chem.* 2006, 16, 1207-1211.
28. Fu, M.; Chaudhary, K.; Lange, J. G.; Kim, H. S.; Juarez, J. J.; Lewis, J. A.; Braun, P. V., Anisotropic Colloidal Templating of 3d Ceramic, Semiconducting, Metallic, and Polymeric Architectures. *Adv. Mater.* 2014, 26, 1740-1745.
29. Hou, J.; Zhang, H.; Yang, Q.; Li, M.; Jiang, L.; Song, Y., Hydrophilic-Hydrophobic Patterned Molecularly Imprinted Photonic Crystal Sensors for High-Sensitive Colorimetric Detection of Tetracycline. *Small* 2015, 11, 2738-2742.
30. Fang, Y.; Ni, Y.; Leo, S.-Y.; Taylor, C.; Basile, V.; Jiang, P., Reconfigurable Photonic Crystals Enabled by Pressure-Responsive Shape-Memory Polymers. *Nat. Commun.* 2015, 6, 7416.
31. Fang, Y.; Ni, Y.; Choi, B.; Leo, S.-Y.; Gao, J.; Ge, B.; Taylor, C.; Basile, V.; Jiang, P., Chromogenic Photonic Crystals Enabled by Novel Vapor-Responsive Shape-Memory Polymers. *Adv. Mater.* 2015, 27, 3696-3704.
32. Lendlein, A.; Jiang, H. Y.; Junger, O.; Langer, R., Light-Induced Shape-Memory Polymers. *Nature* 2005, 434, 879-882.
33. Lendlein, A.; Kelch, S., Shape-Memory Polymers. *Angew. Chem. Int. Ed.* 2002, 41, 2034-2057.
34. Behl, M.; Razzaq, M. Y.; Lendlein, A., Multifunctional Shape-Memory Polymers. *Adv. Mater.* 2010, 22, 3388-3410.
35. Xie, T., Recent Advances in Polymer Shape Memory. *Polymer* 2011, 52, 4985-5000.
36. Gu, X.; Mather, P. T., Water-Triggered Shape Memory of Multiblock Thermoplastic Polyurethanes (TPUS). *RSC Adv.* 2013, 3, 15783-15791.
37. Zhang, H.; Zhao, Y., Polymers with Dual Light-Triggered Functions of Shape Memory and Healing Using Gold Nanoparticles. *ACS Appl. Mater. Interfaces* 2013, 5, 13069-13075.
38. Kuroki, H.; Islam, C.; Tokarev, I.; Hu, H.; Liu, G.; Minko, S., Tunable Ultrathin Membranes with Nonvolatile Pore Shape Memory. *ACS Appl. Mater. Interfaces* 2015, 7, 10401-10406.
39. Xie, T., Tunable Polymer Multi-Shape Memory Effect. *Nature* 2010, 464, 267-270.
40. Huang, W. M.; Yang, B.; Fu, Y. Q., *Polyurethane Shape Memory Polymers*. CRC Press: Boca Raton, Fla., 2012.
41. Meng, H.; Hu, J., A Brief Review of Stimulus-Active Polymers Responsive to Thermal, Light, Magnetic, Electric, and Water/Solvent Stimuli. *J. Intel. Mater. Syst. Str.* 2010, 21, 859-885.
42. Tippets, C. A.; Li, Q.; Fu, Y.; Donev, E. U.; Zhou, J.; Turner, S. A.; Jackson, A.-M. S.; Ashby, V. S.; Sheiko, S. S.; Lopez, R., Dynamic Optical Gratings Accessed by Reversible Shape Memory. *ACS Appl. Mater. Interfaces* 2015, 7, 14288-93.
43. Espinha, A.; Concepcion Serrano, M.; Blanco, A.; Lopez, C., Thermoresponsive Shape-Memory Photonic Nanostructures. *Adv. Optical Mater.* 2014, 2, 516-521.
44. Turner, S. A.; Zhou, J.; Sheiko, S. S.; Ashby, V. S., Switchable Micropatterned Surface Topographies Mediated by Reversible Shape Memory. *ACS Appl. Mater. Interfaces* 2014, 6, 8017-8021.
45. Xu, H.; Yu, C.; Wang, S.; Malyarchuk, V.; Xie, T.; Rogers, J. A., Deformable, Programmable, and Shape-Memorizing Micro-Optics. *Adv. Funct. Mater.* 2013, 23, 3299-3306.
46. Wang, Z.; Hansen, C.; Ge, Q.; Maruf, S. H.; Ahn, D. U.; Qi, H. J.; Ding, Y., Programmable, Pattern-Memorizing Polymer Surface. *Adv. Mater.* 2011, 23, 3669-3673.
47. Schaefer, C. G.; Gallei, M.; Zahn, J. T.; Engelhardt, J.; Hellmann, G. P.; Rehahn, M., Reversible Light-, Thermo-, and Mechano-Responsive Elastomeric Polymer Opal Films. *Chem. Mater.* 2013, 25, 2309-2318.
48. Schaefer, C. G.; Smolin, D. A.; Hellmann, G. P.; Gallei, M., Fully Reversible Shape Transition of Soft Spheres in Elastomeric Polymer Opal Films. *Langmuir* 2013, 29, 11275-11283.
49. Jang, J.-H.; Koh, C. Y.; Bertoldi, K.; Boyce, M. C.; Thomas, E. L., Combining Pattern Instability and Shape-Memory Hysteresis for Phononic Switching. *Nano Lett.* 2009, 9, 2113-2119.
50. Stober, W.; Fink, A.; Bohn, E., Controlled Growth of Monodisperse Silica Spheres in Micron Size Range. *J. Colloid Interf. Sci.* 1968, 26, 62-69.
51. Jiang, P.; Bertone, J. F.; Hwang, K. S.; Colvin, V. L., Single-Crystal Colloidal Multilayers of Controlled Thickness. *Chem. Mater.* 1999, 11, 2132-2140.
52. Satpathy, S.; Zhang, Z.; Salehpour, M. R., Theory of Photon Bands in 3-Dimensional Periodic Dielectric Structures. *Phys. Rev. Lett.* 1990, 64, 1239-1242.
53. Jiang, P.; Hwang, K. S.; Mittleman, D. M.; Bertone, J. F.; Colvin, V. L., Template-Directed Preparation of Macroporous Polymers with Oriented and Crystalline Arrays of Voids. *J. Am. Chem. Soc.* 1999, 121, 11630-11637.
54. Butt, H. J.; Cappella, B.; Kappl, M., Force Measurements with the Atomic Force Microscope: Technique, Interpretation and Applications. *Surf. Sci. Rep.* 2005, 59, 1-152.
55. Odian, G., *Principles of Polymerization*. 3rd ed.; John Wiley & Sons: Staten Island, New York, 1991.
56. Xie, X. N.; Chung, H. J.; Sow, C. H.; Wee, A. T. S., Nanoscale Materials Patterning and Engineering by Atomic Force Microscopy Nanolithography. *Mater. Sci. Eng. R* 2006, 54, 1-48.
57. Nie, H. Y.; Motomatsu, M.; Mizutani, W.; Tokumoto, H., Local Modification of Elastic Properties of Polystyrene-Polyethyleneoxide Blend Surfaces. *J. Vac. Sci. Technol. B* 1995, 13, 1163-1166.

58. Jin, X.; Unertl, W. N., Submicrometer Modification of Polymer Surfaces with a Surface Force Microscope. *Appl. Phys. Lett.* 1992, 61, 657-659.
59. Robertso. Re, Theory for Plasticity of Glassy Polymers. *J. Chem. Phys.* 1966, 44, 3950-3956.
60. Lee, H.-N.; Paeng, K.; Swallen, S. F.; Ediger, M. D., Direct Measurement of Molecular Mobility in Actively Deformed Polymer Glasses. *Science* 2009, 323, 231-234.
61. Lee, K. J.; Yoon, J.; Rahmani, S.; Hwang, S.; Bhaskar, S.; Mitragotri, S.; Lahann, J., Spontaneous Shape Reconfigurations in Multicompartmental Microcylinders. *Proc. Natl. Acad. Sci. U.S.A.* 2,012,109, 16057-16062.
62. Lee, J. H.; Veysset, D.; Singer, J. P.; Retsch, M.; Saini, G.; Pezeril, T.; Nelson, K. A.; Thomas, E. L., High Strain Rate Deformation of Layered Nanocomposites. *Nat. Commun.* 2012, 3, 1164.
63. He, L.; Janner, M.; Lu, Q.; Wang, M.; Ma, H.; Yin, Y., Magnetochromatic Thin-Film Microplates. *Adv. Mater.* 2015, 27, 86-92.
64. Yang, D.; Ye, S.; Ge, J., From Metastable Colloidal Crystalline Arrays to Fast Responsive Mechanochromic Photonic Gels: An Organic Gel for Deformation-Based Display Panels. *Adv. Funct. Mater.* 2014, 24, 3197-3205.
65. Fudouzi, H.; Sawada, T., Photonic Rubber Sheets with Tunable Color by Elastic Deformation. *Langmuir* 2006, 22, 1365-1368.
66. Altebaeumer, T.; Gotsmann, B.; Pozidis, H.; Knoll, A.; Duerig, U., Nanoscale Shape-Memory Function in Highly Cross-Linked Polymers. *Nano Lett.* 2008, 8, 4398-4403.
67. Hu, Z.; Tian, M.; Nysten, B.; Jonas, A. M., Regular Arrays of Highly Ordered Ferroelectric Polymer Nanostructures for Non-Volatile Low-Voltage Memories. *Nat. Mater.* 2009, 8, 62-67.
68. Zhang, Y. Q.; Fu, Q. Q.; Ge, J. P., Photonic Sensing of Organic Solvents through Geometric Study of Dynamic Reflection Spectrum. *Nat. Commun.* 2015, 6, 7510.
69. Wang, H.; Zhang, K.-Q., Photonic Crystal Structures with Tunable Structure Color as Colorimetric Sensors. *Sensors* 2013, 13, 4192-4213.
70. Lee, J.-H.; Koh, C. Y.; Singer, J. P.; Jeon, S.-J.; Maldovan, M.; Stein, 0.; Thomas, E. L., 25th Anniversary Article: Ordered Polymer Structures for the Engineering of Photons and Phonons. *Adv. Mater.* 2014, 26, 532-568.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A structure comprising: a porous polymer membrane including an ordered array of voids, wherein the distance between at least two pairs of adjacent voids is substantially the same, wherein a polymer framework separates the voids, wherein when the voids are in a collapsed state the porous polymer membrane is substantially clear, wherein when the voids are in a uncollapsed state the porous polymer membrane has an iridescent color, wherein upon pressure to an area of the collapsed voids, the collapsed voids renew their uncollapsed state, and wherein upon exposure to an area of the collapsed void to a solvent, the collapsed voids renew their uncollapsed state.

2. The structure of claim 1, wherein the distance between each pair of adjacent voids is substantially the same.

3. The structure of claim 1, wherein the distance between 50% of the pairs of adjacent voids is substantially the same.

4. The structure of claim 1, wherein the distance between 75% of the pairs of adjacent voids is substantially the same.

5. The structure of claim 1, wherein the distance between 90% of the pairs of adjacent voids is substantially the same.

6. The structure of claim 1, wherein the number of unique pairs is about 10 to $1 \times 10^{20}$.

7. The structure of claim 1, wherein each void has a diameter that is about the same.

8. The structure of claim 1, wherein the diameter of the void is about 100 nm to 1000 nm.

9. The structure of claim 1, wherein the polymer framework is a co-polymer of ethoxylated trimethylolpropane triacrylate (ETPTA) and polyethylene glycol diacrylate (PEGDA).

10. The structure of claim 1, wherein the porous polymer membrane has a thickness of about 1 micrometer to 300 micrometers.

* * * * *